United States Patent
Masui et al.

(10) Patent No.: US 7,137,614 B2
(45) Date of Patent: Nov. 21, 2006

(54) VALVE DEVICES FOR CONTROLLING FLOW OF INTAKE AIR

(75) Inventors: Toshiyuki Masui, Aichi-ken (JP); Katsuji Ishikawa, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/963,751

(22) Filed: Oct. 14, 2004

(65) Prior Publication Data

US 2005/0109970 A1   May 26, 2005

(30) Foreign Application Priority Data

| Oct. 15, 2003 | (JP) | ............................. 2003-355022 |
| Oct. 15, 2003 | (JP) | ............................. 2003-355026 |
| Oct. 22, 2003 | (JP) | ............................. 2003-362330 |

(51) Int. Cl.
   *F16K 31/02* (2006.01)
(52) U.S. Cl. .................. 251/129.11; 251/305; 123/337
(58) Field of Classification Search ................ 251/305, 251/306, 129.11; 123/337, 361, 399; 310/43, 310/254
   See application file for complete search history.

(56) References Cited

U.S. PATENT DOCUMENTS

| 5,884,898 A | * | 3/1999 | Miyairi ....................... 251/305 |
| 6,067,961 A | * | 5/2000 | Kato ........................... 123/399 |
| 6,497,245 B1 | * | 12/2002 | Torii ....................... 137/315.11 |
| 6,742,496 B1 | * | 6/2004 | Hattori et al. .............. 123/337 |

FOREIGN PATENT DOCUMENTS

JP   2002018170   1/2002

\* cited by examiner

*Primary Examiner*—Edward K. Look
*Assistant Examiner*—John K. Fristoe, Jr.
(74) *Attorney, Agent, or Firm*—Dennison, Schultz & MacDonald

(57) ABSTRACT

A valve device controls a flow of intake air within a surge tank connected to an engine. The surge tank is divided into a plurality of tank chambers by a partition wall disposed within the surge tank. The valve devices include a valve body and a valve member. The valve body has a frame mounted within a communication opening defined within the partition wall. The valve member is rotatably mounted to the valve body in order to open and close a frame opening defined in the frame. A motor is coupled to the valve member in order to rotate the valve member. The motor includes a stator molded integrally with the valve body.

17 Claims, 22 Drawing Sheets

VALVE DEVICES FOR CONTROLLING FLOW OF INTAKE AIR

This application claims priority to Japanese patent application serial numbers 2003-355022, 2003-355026 and 2003-362330, the contents of which are incorporated herein by reference.

BACKGROUND OF THE INVENTION

1. Field of the Invention

The present invention relates to valve devices for controlling the flow of intake air supplied to internal combustion engines, in particular, multicylinder internal combustion engines.

2. Description of the Related Art

In order to control the flow of intake air of multicylinder internal combustion engines, variable intake air systems having valve devices have been used. In particular, in order to shift nodes of acoustic oscillations the intake air may produce and to increase an effective intake-air column length, variable intake air systems known as "acoustic control induction systems (ACIS)" have been proposed.

Japanese Laid-Open Patent Publication No. 2000-55200 teaches a valve device for controlling the flow of intake air and for use with an acoustic control induction system. The valve device includes a valve body, a valve member, and an actuator. The valve body is made of resin and has a frame portion fittable into an opening defined within a partition wall. The partition wall is disposed within a tank chamber of a surge tank of an internal combustion engine in order to divide the tank chamber into sub-chambers. The valve member is rotatably mounted on the valve body in order to open and close an opening defined by the frame portion of the valve body. The valve member operates in order to permit and interrupt communication between the sub-chambers. The actuator serves to rotate the valve member.

In the above publication, a diaphragm-type, negative-pressure control device is typically incorporated as the actuator. However, this type of actuator involves various components and tubes, complicating assembly and increasing manufacturing costs.

SUMMARY OF THE INVENTION

It is accordingly an object of the present invention to teach improved and simplified valve devices for controlling the flow of intake air supplied to a multicylinder internal combustion engines.

According to one aspect of the present teachings, valve devices are taught that control the flow of an intake air within a surge tank connected to an engine. The surge tank is divided into a plurality of tank chambers by a partition wall disposed within the surge tank. The valve devices include a valve body and a valve member. The valve body has a frame mounted within a communication opening defined in the partition wall. The valve member is rotatably mounted to the valve body in order to open and close a frame opening defined within the frame. A motor is coupled to the valve member in order to rotate the valve member. The motor includes a stator molded integrally with the valve body. For example, the stator may include a stator core and a stator coil.

Therefore, a fixing device or a mounting device, such as screws, for mounting the stator is not necessary. In addition, a separate motor housing to which the stator is mounted is not necessary. Therefore, the number of parts and the number of assembly steps of the valve device can be reduced or minimized. As a result, the manufacturing costs of the valve devices can be reduced relative to conventional valve devices. In addition, the use of fewer parts may allow the valve devices to have a lightweight construction.

Preferably, the valve body is made of resin and the stator is molded integrally within the valve body by an insertion molding process.

Preferably, the valve body further includes an integral motor housing formed with the frame. The stator is molded within the integrated motor housing.

In another aspect of the present teachings, the valve devices further include a first rotary shaft connected to a first end of the valve member on the side of the valve member nearest to the motor. The frame includes a first frame portion on the side of the motor. A first support portion is formed comprising an outer diameter on the first frame portion. The first frame portion has a thickness substantially equal to or greater than the outer diameter of the first support portion.

Therefore, the supporting strength of the first support portion as well as the strength of the entire frame can be improved.

Preferably, the first frame portion on the side of the motor further includes a thickness reduced portion. Therefore, it is possible to design a mold for molding the frame such that the flow of the resin in the region of the first frame portion becomes uniform. As a result, potential molded in stress and strain, evidenced in part by characteristics such as surface sink due to heat contraction, can be reduced to improve both the quality and the accuracy in the resultant size of the frame.

Preferably, the motor further includes a rotor having a rotor shaft. The first rotary shaft is the rotor shaft.

In another aspect of the present teachings, the valve devices further include a second rotary shaft connected to a second end of the valve member on the side opposite to the motor. The frame further includes a second frame portion on the side opposite to the motor. A second support portion is formed in the second frame portion in order to rotatably support the second rotary shaft. The second frame portion is engageable with a projection formed on the partition wall along the communication opening in a position directly opposing the second frame portion. The projection has a thickness greater than the thickness of the partition wall.

The second frame portion can therefore be stably supported by the projection of the partition wall.

Preferably, the projection has a width substantially equal to the width of the second frame portion. Therefore the supporting strength of the second frame by the projection can be improved and any possible stress applied to the projection by the intake air due to pulsation of the intake air can be effectively relaxed.

In another aspect of the present teachings, valve devices are taught that include a valve body, a valve member, a motor and a motor housing. The valve body has a frame mounted within a communication opening defined in a partition wall disposed within a surge tank. The valve body includes a frame defining a frame opening. The valve member is rotatably mounted to the valve body in order to open and close the frame opening. The motor is coupled to the valve member in order to rotate the valve member and is received within the motor housing. The motor includes a rotor shaft directly coupled to the valve member. The valve member rotates from a first position to a second position as the motor is energized. The energized motor produces a rotational torque for rotating the rotor shaft in a first direction. The valve devices further include a valve returning device that serves to return the valve member from the second position to the first position when the motor is de-energized. The valve returning device is disposed within the motor housing. Preferably, the motor housing is formed integrally with the valve body.

Because the rotor shaft of the motor is directly coupled to the valve member, no separate linking mechanisms or speed reduction mechanisms are interposed between the motor and the valve member. Therefore, the construction of the valve device can be simplified and contained within a relatively compact overall space. In addition, because the valve returning device is disposed within the motor housing, the valve returning device may be sheltered from the environment outside of the motor housing. Consequently, no additional housing is necessary for the valve returning device. Therefore, the valve device may also be compact in size in this respect.

In another aspect of the present teachings, the valve returning device includes a coil spring, a first spring support member, and a second spring support member. The first spring support member serves to connect a first end of the coil spring to the rotor shaft. The second spring support member serves to connect a second end of the coil spring to the motor housing, so that the coil spring applies a rotational torque to the rotor shaft in a direction opposite to the first direction. A cover is mounted to the motor housing in order to close and seal a housing opening formed in the motor housing. The second spring support member is formed on an inner wall of the cover.

Therefore, the valve returning mechanism can be set into the motor housing at the same time that the housing opening is closed by the cover.

In another aspect of the present teachings, the housing opening is defined in the motor housing in order to insert the first spring support member and the coil spring into the motor housing.

In another aspect of the present teachings, the motor housing comprises a tubular portion that includes the housing opening. The cover is closely fitted into the tubular portion.

In another aspect of the present teachings, the rotor shaft has an end portion comprising a non-circular cross section. The first spring support member has a corresponding fitting hole having a non-circular configuration conforming to the cross sectional configuration of the end portion of the rotor shaft. The end portion of the rotor shaft is press-fitted into the fitting hole of the first spring support member. A plurality of fitting projections is formed on the inner periphery of the fitting hole and extends in a fitting direction of the end portion of the rotor shaft. The fitting hole includes at least one corner portion. A substantially semi-circular recess is formed in the first spring support member around the corner portion to extend parallel to the fitting projections.

Because the end portion of the rotor shaft and the fitting hole of the first spring support member have a non-circular cross section and are fitted with each other, the first spring support member can be reliably connected to the rotor shaft so as to not rotate relative to each other. In addition, because the fitting projections are formed on the inner periphery of the fitting hole, the fitting force may be concentrated at the fitting projections during the fitting operation. Consequently, the fitting projections may be crushed or otherwise deformed to accommodate a tight fit of the end portion of the rotor shaft. Further, since the fitting projections are deformed, the first spring support member is reliably prevented from being broken during the fitting operation. Since the semi-circular recess is formed around the corner portions of the fitting hole, no acute angle portions or stress concentration sites are formed at the corner portions along the inner periphery of the fitting hole. Therefore, the first spring member may be stronger and result in less breakage at the corner portions.

In another aspect of the present teachings, the fitting hole has a substantially semi-circular configuration with a curved portion and a linear portion. The fitting projections are formed along the curved portion. A semi-circular recess is formed around each end of the linear portion.

In another aspect of the present teachings, the first spring support member includes a first stopper portion. The second spring support member includes a second stopper portion. The first stopper portion and the second stopper portion contact with each other so as to prevent or limit further movement of the valve member in one direction. The movement of the valve member is limited in the direction of movement resulting from the biasing force of the coil spring. The biasing force of the coil spring causes the valve member to return to the first position. The valve member can then be reliably returned to the first position or the original position and not beyond this point when the motor has been de-energized or the supply of current to the motor has been interrupted.

In another aspect of the present teachings, the valve devices further include a retainer and a positioning protrusion formed on the inner wall of the cover. The retainer serves to retain engagement of the second end of the coil spring with the second spring support member. The positioning protrusion serves to support the coil spring in a position axially aligned with the rotor shaft. Therefore, the fitting operation of the coil spring on to the first spring support member, which is coupled to the rotor shaft, can be easily performed.

In another aspect of the present teachings, the cover has a substantially cylindrical tubular configuration with an open end and a closed end. A positioning projection and a positioning recess for engaging the positioning projection are formed on one and the other of the cover and the tubular portion of the motor housing in order to position the cover relative to the tubular portion in a circumferential direction. Therefore, the cover can be reliably positioned relative to the motor housing in a predetermined position in the circumferential direction.

In another aspect of the present teachings, valve devices are taught that include a valve body, a valve member, and a motor. The valve body has a frame mounted within a communication opening defined in a partition wall disposed within a surge tank. The valve body includes a frame defining a frame opening. The valve member is rotatably mounted to the valve body in order to open and close the frame opening. The motor is coupled to the valve member via a rotor shaft of the motor in order to rotate the valve member. The valve member rotates from a first position to a second position when a current is supplied to the motor. The current is supplied to the motor in order to produce a rotational torque for rotating the rotor shaft in a first direction. For example, the first position may be a fully opened position and the second position may be a fully closed position. The valve devices further include a spring, such as a coil spring. The coil spring serves to return the valve member from the second position to the first position when the supply of current to the motor is stopped or interrupted. The rotational torque of the motor varies in response to a rotational angle of the rotor shaft when a substantially constant current is supplied to the motor. The rotational torque produced by the motor is greater than the rotational torque of the spring during the rotation of the rotor shaft from a first rotational angle (θx), corresponding to the first position of the valve member, to a second rotational angle (θy), corresponding to the second position of the valve member.

Also in this arrangement, the rotor shaft may be directly coupled to the valve member. Therefore, no link mechanism or speed reduction mechanism is interposed between the motor and the valve member. As a result, the construction of the valve device can be simplified and may be relatively compact in size. In addition, due to the above selection of the rotational torque of the motor, the motor can reliably rotate the valve member from the first position to the second position against the rotational torque, i.e., the biasing force, of the spring.

In another aspect of the present teachings, the rotational torque produced by the motor changes from a first torque (TM1) to a maximum torque and further to a second torque (TM2) during the rotation of the rotor shaft from the first rotational angle (θx) to the second rotational angle (θy). The second torque (TM2) is greater than the first torque (TM1). In addition, the difference between the second torque (TM2) and the first torque (TM1) is greater than the increased value of the rotational torque applied by the spring during rotation from the first position to the second position.

Therefore, by setting the first torque (TM1) of the motor produced at the first rotational angle (θx) (corresponding to the first position of the valve member) to be greater by a necessary minimum value than the rotational torque of the spring produced at the same rotational angle (θx), it can be ensured that the rotational torque of the motor exceeds the rotational torque of the spring throughout the rotational range between the first position and the second position.

In another aspect of the present teachings, the ratio of increase of the rotational torque during a rotational range around the first rotational angle (θx) is greater than the ratio of decrease of the rotational torque during a rotational range around the second rotational angle (θy). Therefore, with the second torque (TM2) at the second rotational angle (θy) set to be greater than the first torque (TM1) at the first rotational angle (θx), the difference between the second torque (TM2) and the first torque (TM1) can be set to have a large value.

DETAILED DESCRIPTION OF THE INVENTION

Each of the additional features and teachings disclosed above and below may be utilized separately or in conjunction with other features and teachings to provide improved valve devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A representative embodiment will now be described with reference to FIGS. 1 to 19. The representative embodiment relates to a valve device for controlling flow of intake air for use with an acoustic control induction system (ACIS).

Figure 18:
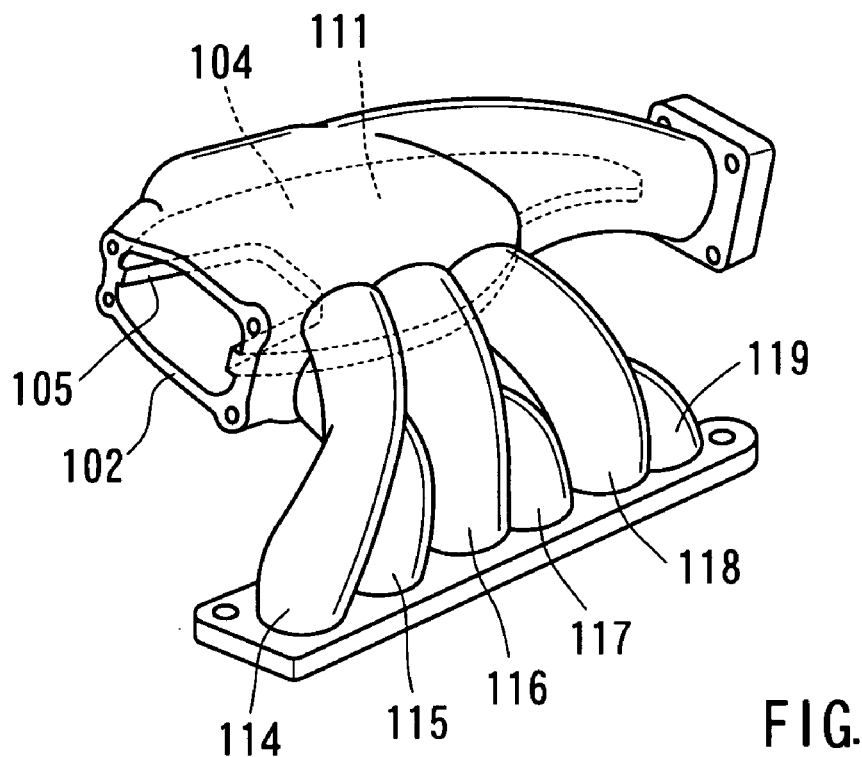
FIG. 18(a) is a perspective view of the surge tank.
FIG. 18(b) is a schematic view showing an intake system of an engine.
Figure 18:
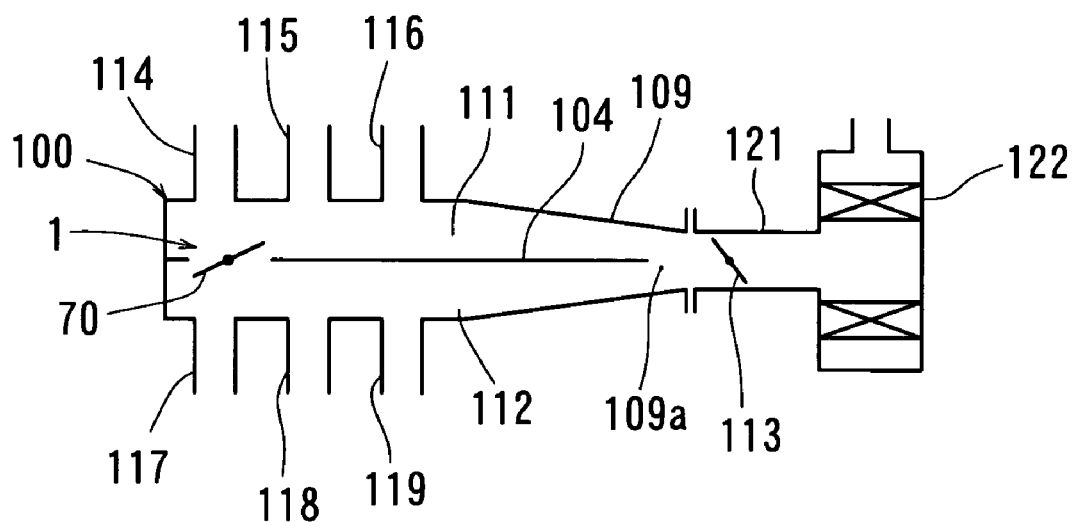
Figure 19:
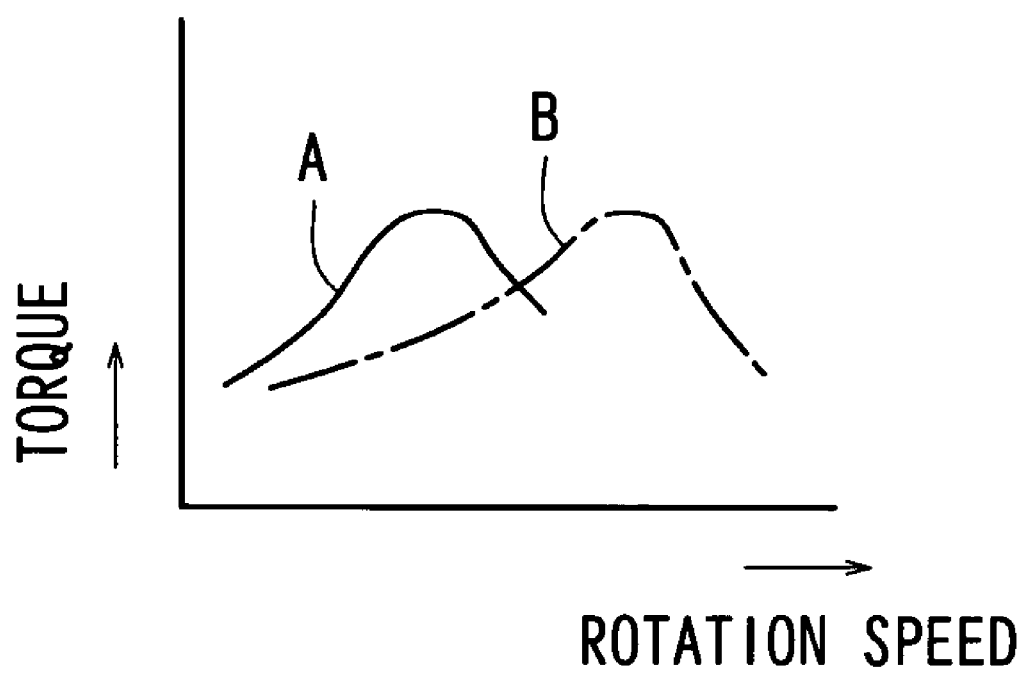
FIG. 19 is a graph showing the relation between the rotational speed of the engine and a torque.
Figure 20:
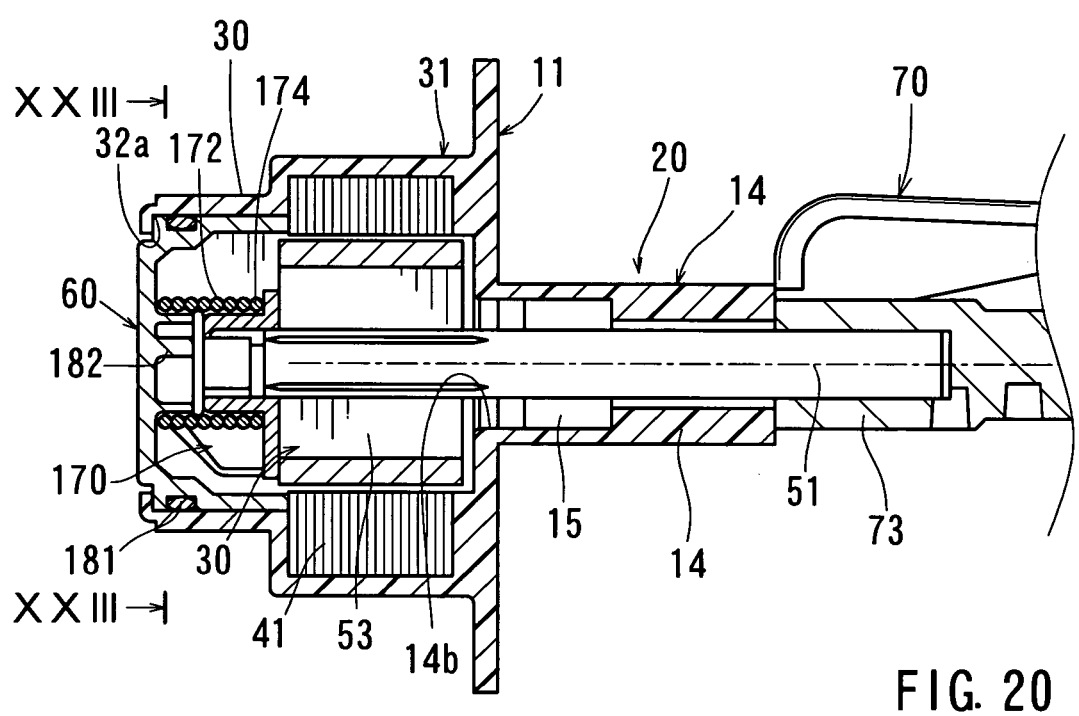
FIG. 20 is an enlarged view of the valve device incorporating a representative valve returning device.
Figure 21:
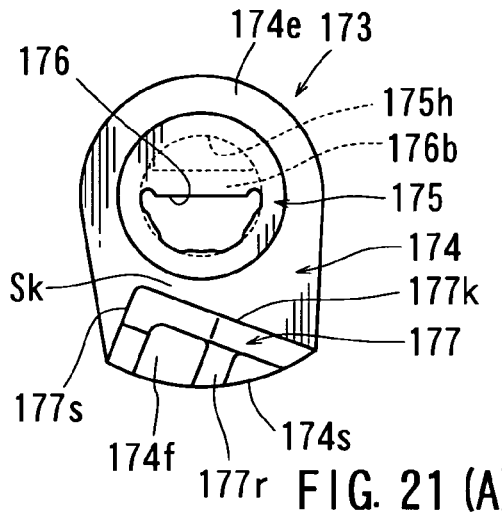
FIGS. 21(A) and 21(B) are a plan view and a partial cross sectional side view of a first support member of the representative valve returning device.
FIG. 21(C) is a view similar to FIG. 21(B) but showing the state where the first support member is fixed to the rotor shaft.
FIG. 21(D) is an enlarged view of a pressure-fitting hole formed in the first support member.
Figure 21:
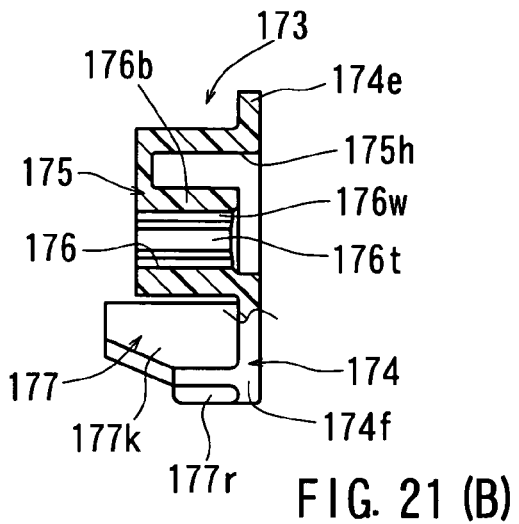
Figure 21:
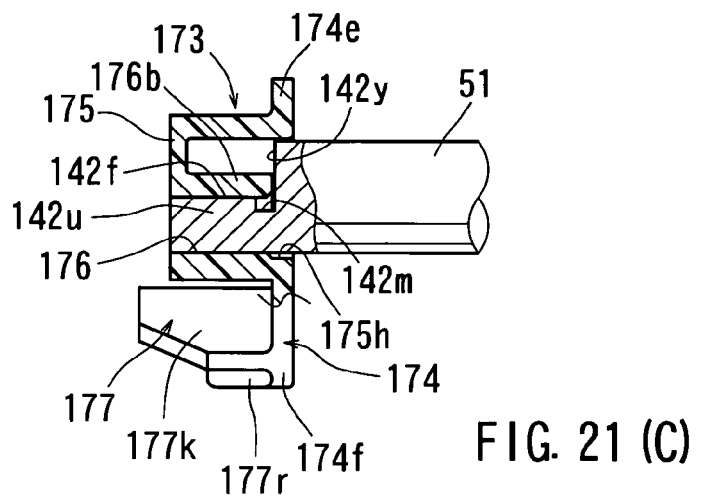
Figure 21:
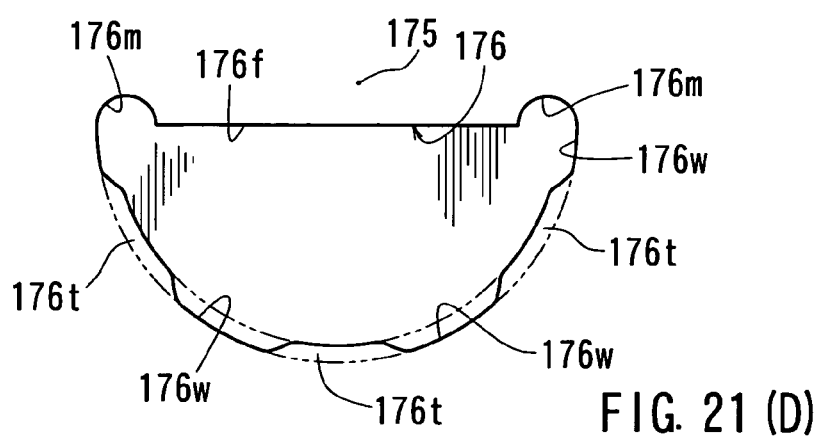
Figure 22:
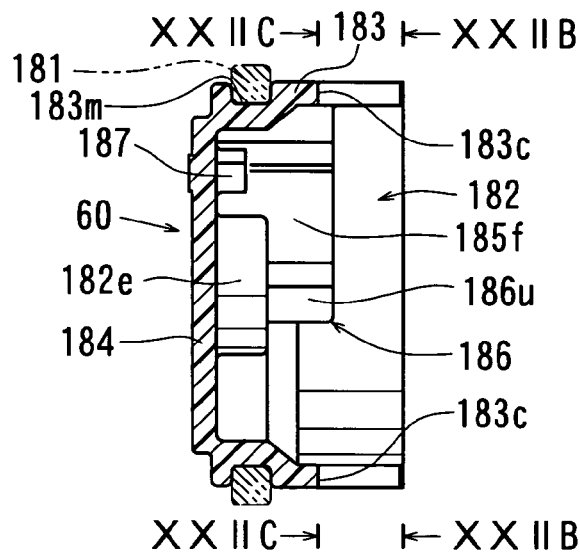
FIG. 22(A) is a vertical sectional view of a cover of the representative valve returning device.
FIGS. 22(B) and 22(C) are cross sectional views taken along line B—B and line C—C in FIG. 22(A)
Figure 22:
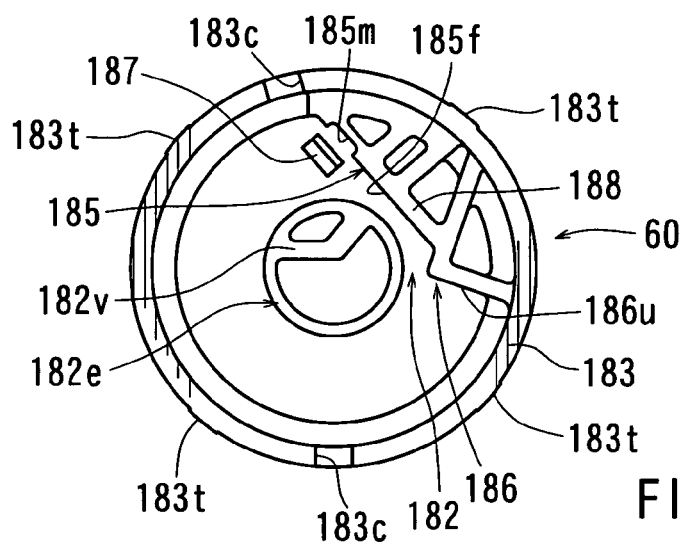
Figure 22:
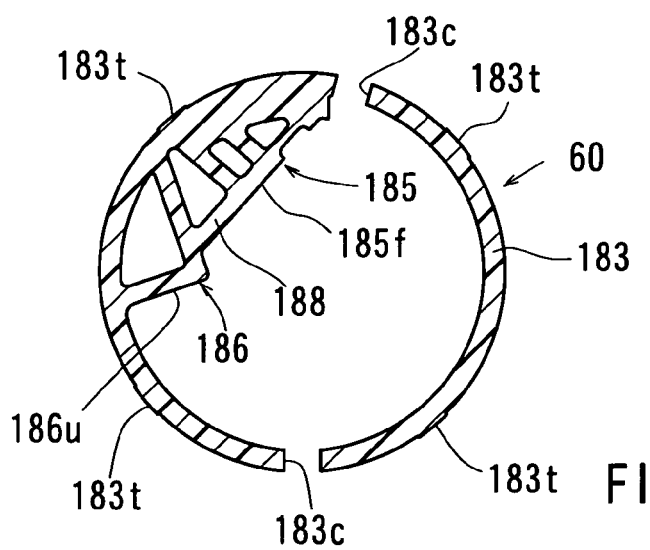
Figure 23:
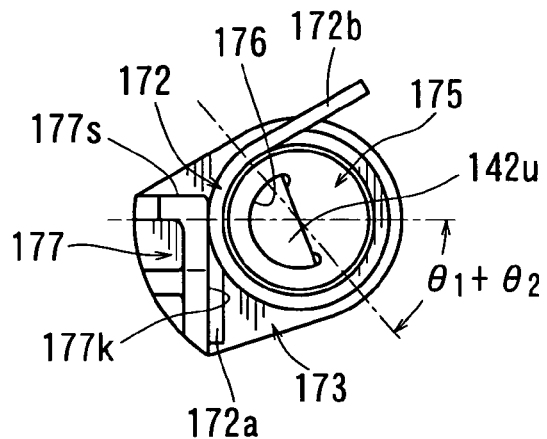
FIG. 23(A) is a plan view showing the first support member and a torque spring fitted to the first support member.
FIGS. 23(B) and 23(C) are cross sectional views showing the assembled state of the valve returning device taken along line XXIII—XXIII in FIG. 20.
Figure 23:
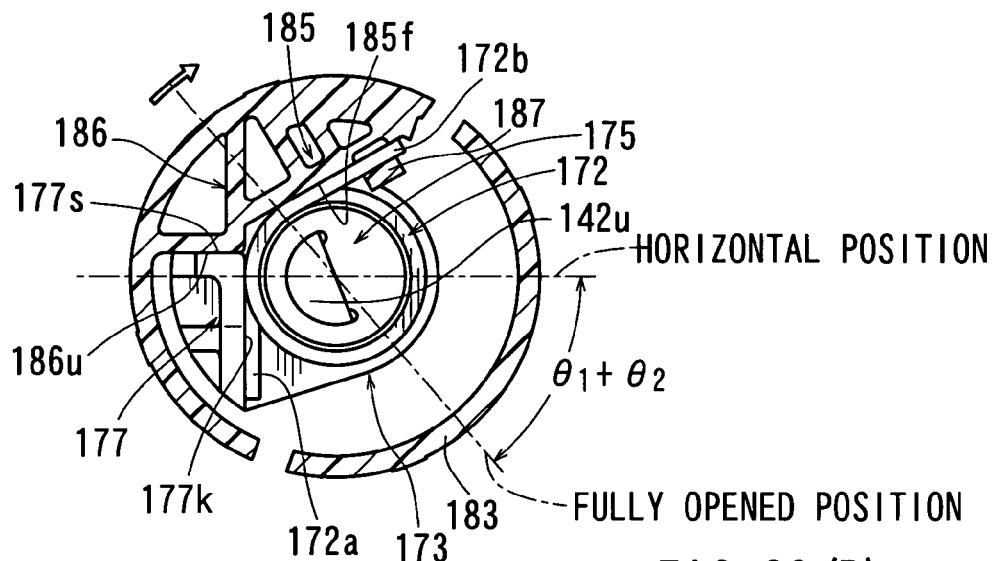
Figure 23:
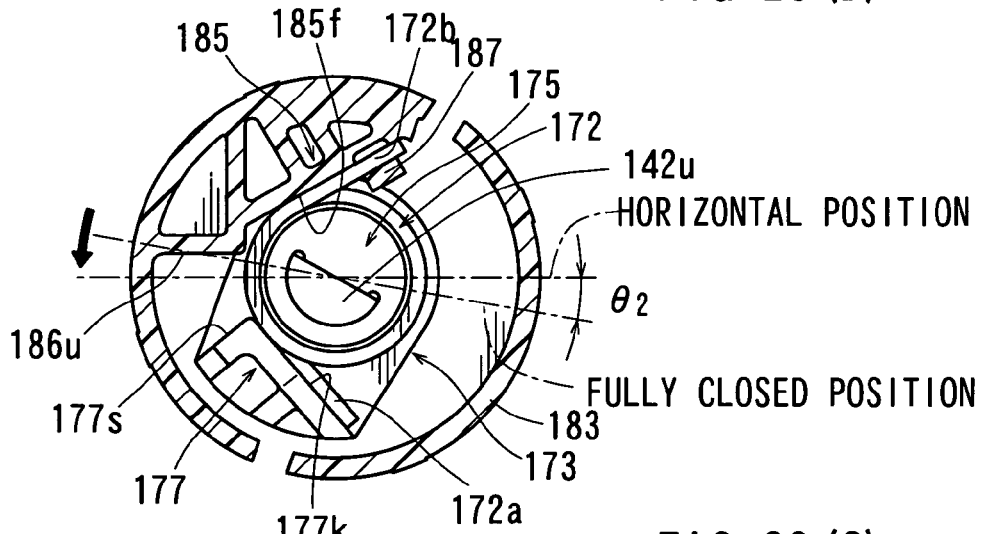
Figure 24:
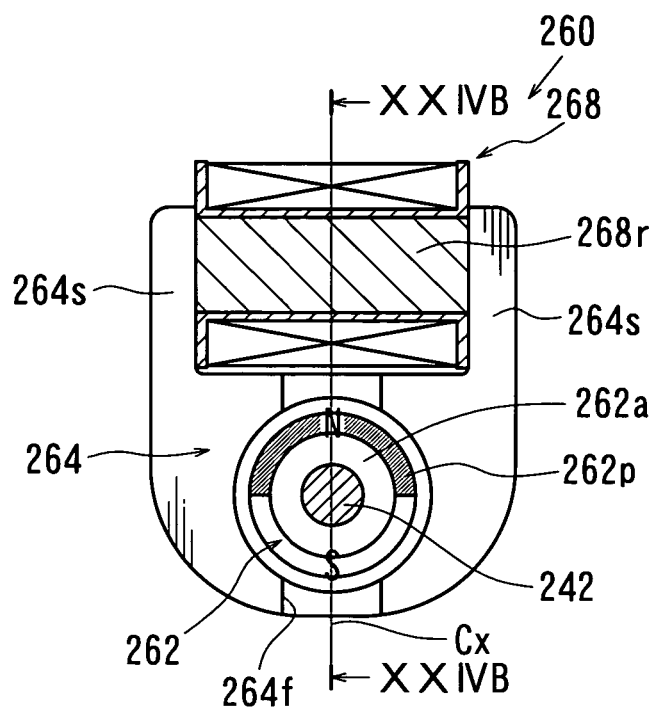
FIGS. 24(A) and 24(B) are a rear view and a vertical sectional view of a representative motor for rotating a valve member.
Figure 24:
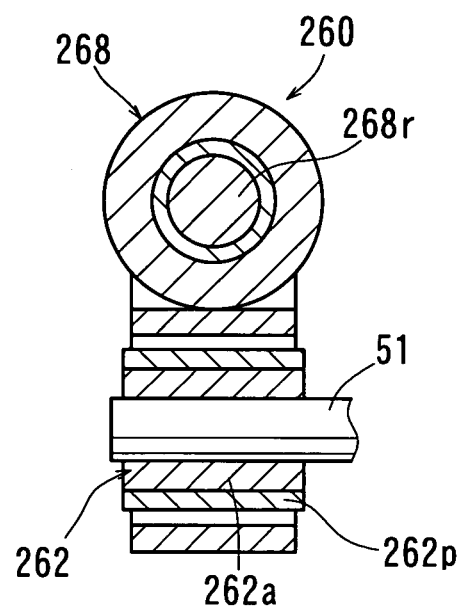
Figure 25:
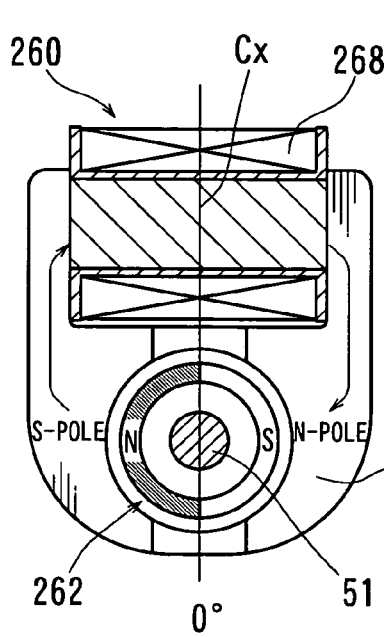
FIGS. 25(A), 25(B), 25(C) and 25(D) are rear views of the representative motor and showing the operation of the motor.
Figure 25:
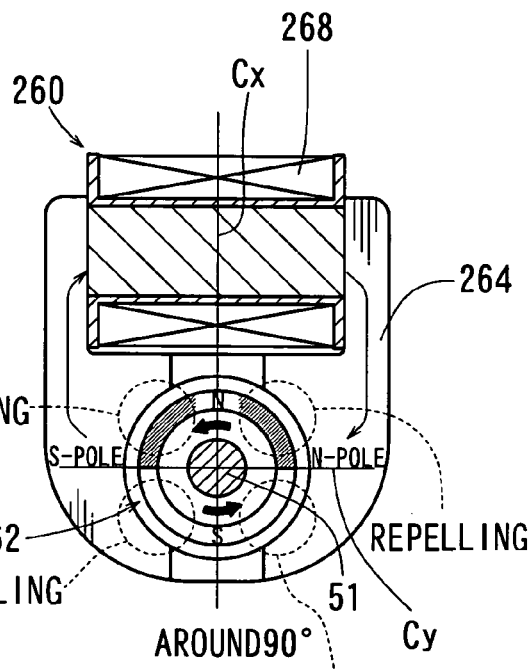
Figure 25:
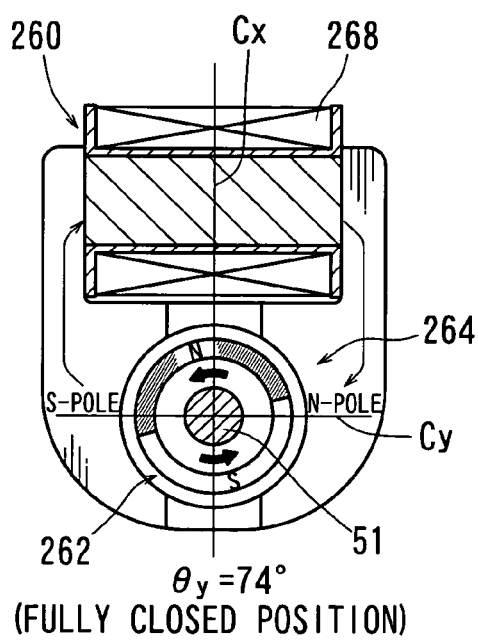
Figure 25:
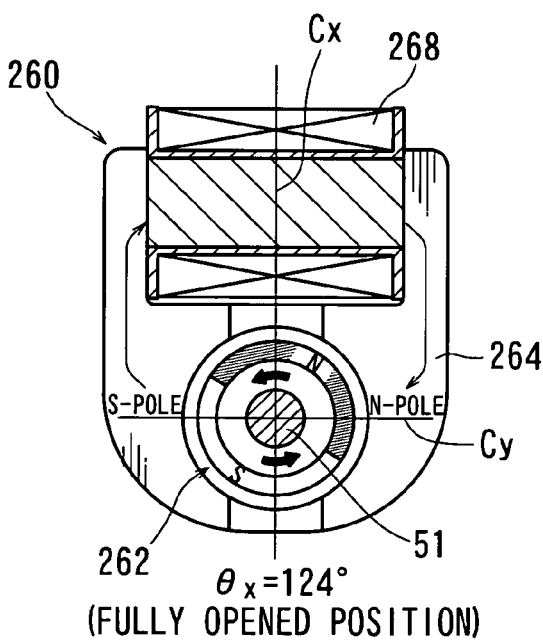
Figure 26:
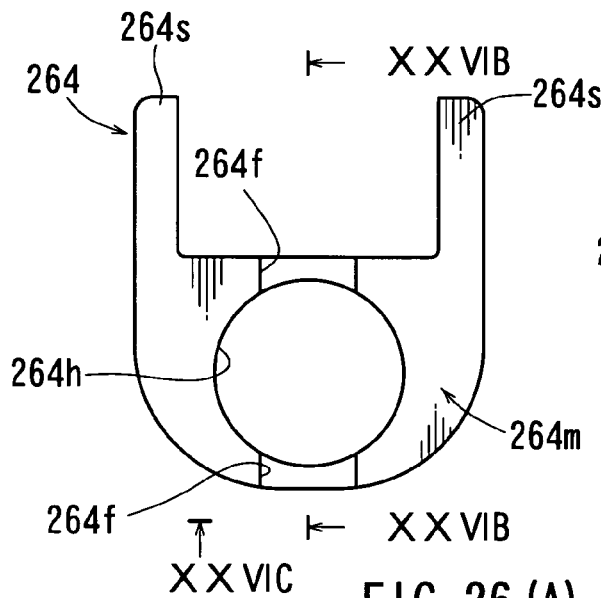
FIG. 26(A) is a rear view of a stator core of the motor.
FIG. 26(B) is a cross sectional view taken along line-XXVI—XXVI in FIG. 26(A)
FIG. 26(C) is a view of the stator core as viewed in a direction indicated by an arrow XXVI(C) in FIG. 26(A)
FIG. 26(D) is a rear view of the motor and showing the magnetic flux produced by the motor.
Figure 26:
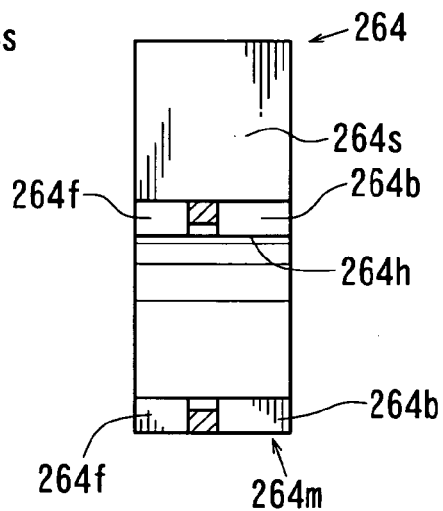
Figure 26:
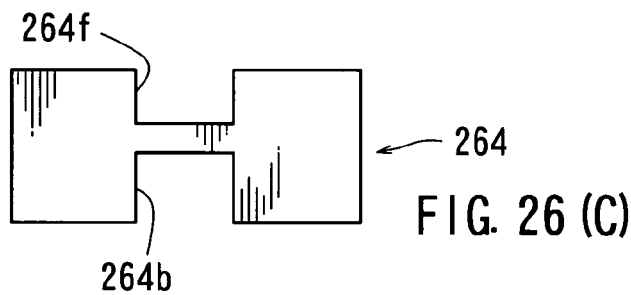
Figure 26:
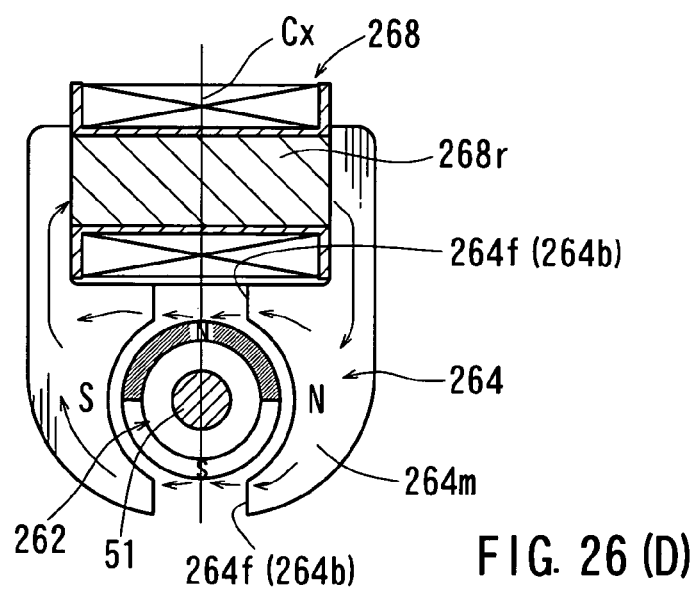
Figure 27:
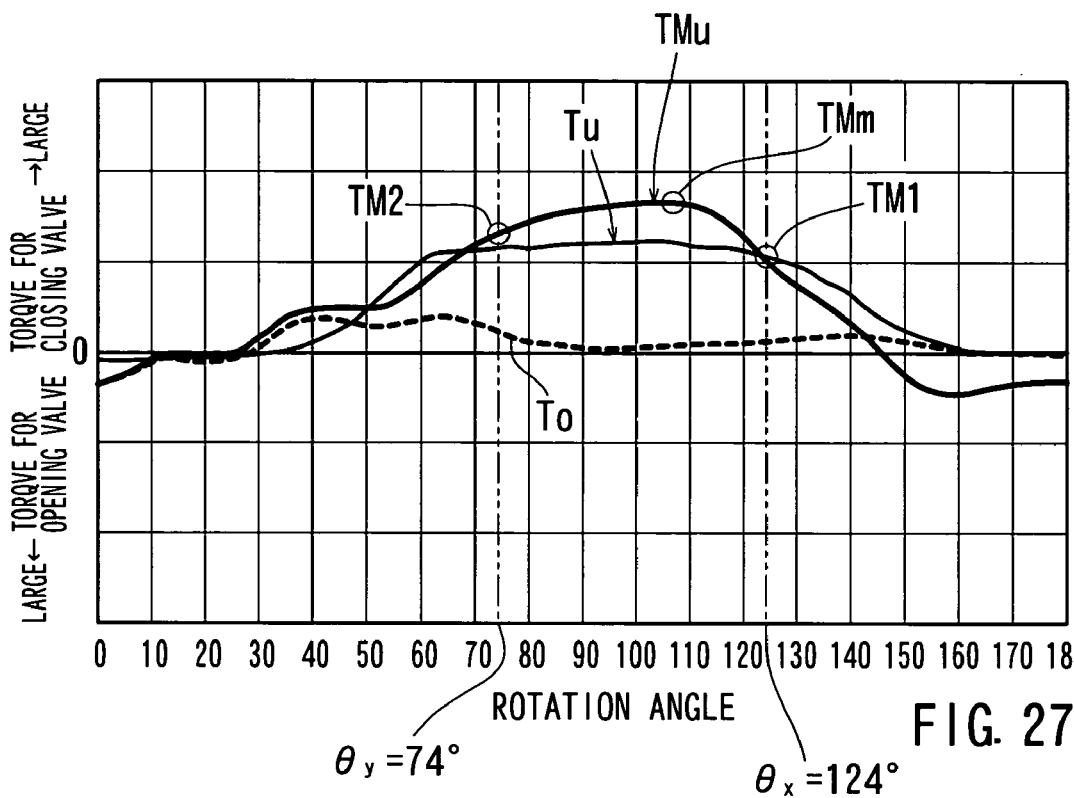
FIG. 27(A) is a graph showing characteristics of the rotational torque produced by the motor.
FIG. 27(B) is a graph showing the relation between characteristics of the rotational torque produced by the motor and the characteristics of the rotational torque produced by the torque spring.
Figure 27:
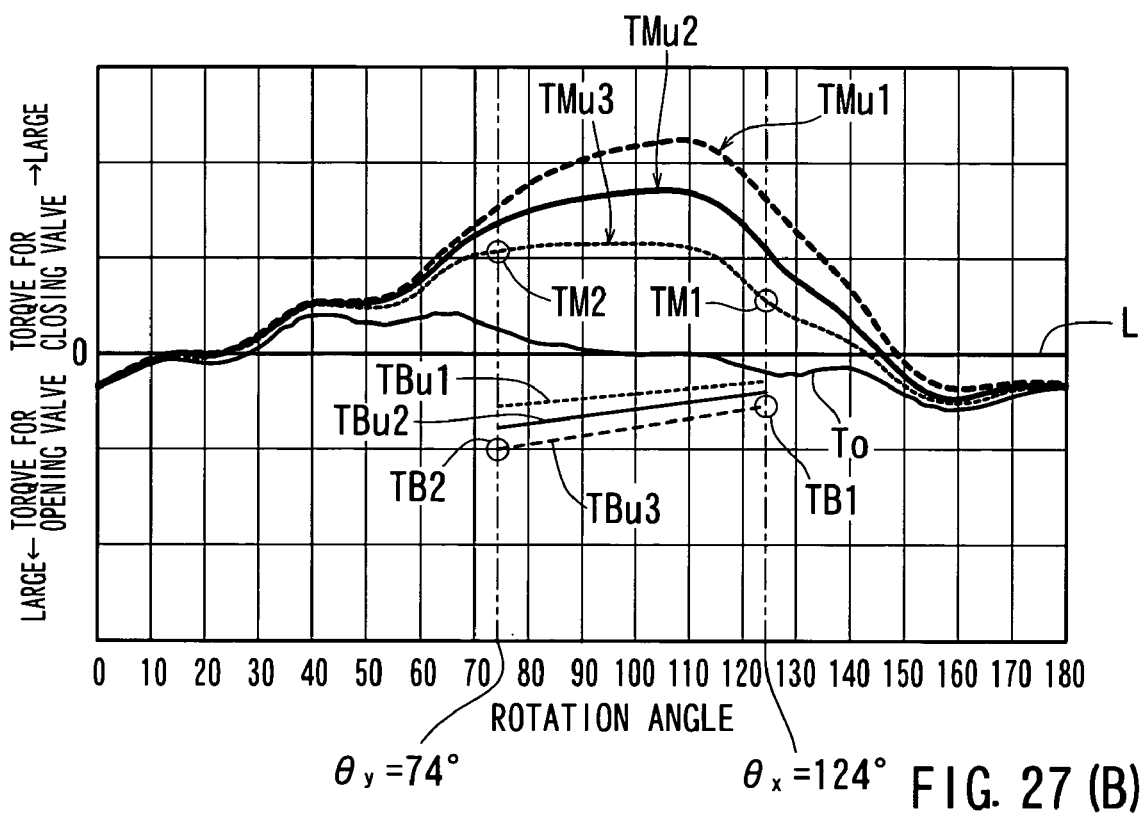

The ACIS will be first described with reference to FIGS. 18 (A) and 18(B). A surge tank 100 constitutes an intake air system for six-cylinder internal combustion engine (not shown). A first tank chamber 111 and a second tank chamber 112 are defined within the surge tank 100 and are separated from each other by a partition wall 104. Intake branch tubes 114, 115, and 116, are connected between the first tank chamber 111 and engine cylinders (not shown) having different intake strokes from one another. Similarly, intake branch tubes 117, 118, and 119, are connected between the second tank chamber 112 and engine cylinders (not shown) having different intake strokes from one another. A valve device 1 is mounted on the partition wall 104 and has a valve member 70 that is operable to permit and interrupt communication between the first tank chamber 111 and the second tank chamber 112. The surge tank 100 has a duct portion 109 that is connected to an air cleaner 122 via a throttle body 121. A throttle valve 113 is disposed within the throttle body 121 and is opened and closed in response to the operation of an accelerator pedal (not shown).

During a high-load and low-speed operation of the engine, the valve member 70 of the valve device 1 is closed. For this situation, the intake-air branching section 109a within the duct portion 109 of the surge tank 100 serves as a node of air-column oscillation that may be produced due to pulsations of the intake air. Therefore, the frequency of the oscillation may be lowered. As a result, due to the inertial force of the intake air, the efficiency of filling the intake air increases, so that the torque referred to as "shaft torque" may increase during the low-speed operation, as indicated by the torque line A in FIG. 19. However, during a high-load and high-speed operation of the engine, the valve member 70 of the valve device 1 is opened. For this situation, the open ends of the branch tubes 114 to 119 serve as nodes of air-column oscillation that may be produced due to pulsations of the intake air. Therefore, the frequency of the oscillation may be higher. As a result, also due to the inertial force of the intake air, the efficiency of filling the intake air increases, so that the torque may increase during the high-speed operation as indicated by torque line B in FIG. 19.

The detailed construction of the surge tank 100 will now be described with reference to FIGS. 14 to 17. For the purposes of explanation, front and rear directions, left and right directions, and upper and lower directions used in this specification with regard to the surge tank 100 and the valve device 1 will be determined as indicated by reference arrows in the drawings. As shown in FIG. 15, a valve insertion hole 102 is formed in a rear wall 101 of the surge tank 100. The valve insertion hole 102 is in a position rearwardly opposing to the partition 104. The valve insertion hole 102 has a substantially rectangular configuration, elongated in the right and left directions. A generally U-shaped cutout recess 105 is formed in the partition wall 104 in a position opposing the valve insertion hole 102.

A projection 106 is formed on the front edge of the cutout recess 105 (to the right in FIG. 15), so that the projection 106 protrudes in the rearward direction from the front edge. The projection 106 has a width 106w in right and left directions along the front edge of the cutout recess 105. The right and left ends of the projection 106 are respectively inclined toward the right and left edges of the cutout recess 105. The protruding distances of the projection 106 decrease towards the right and left ends of the projection 106

Figure 15:
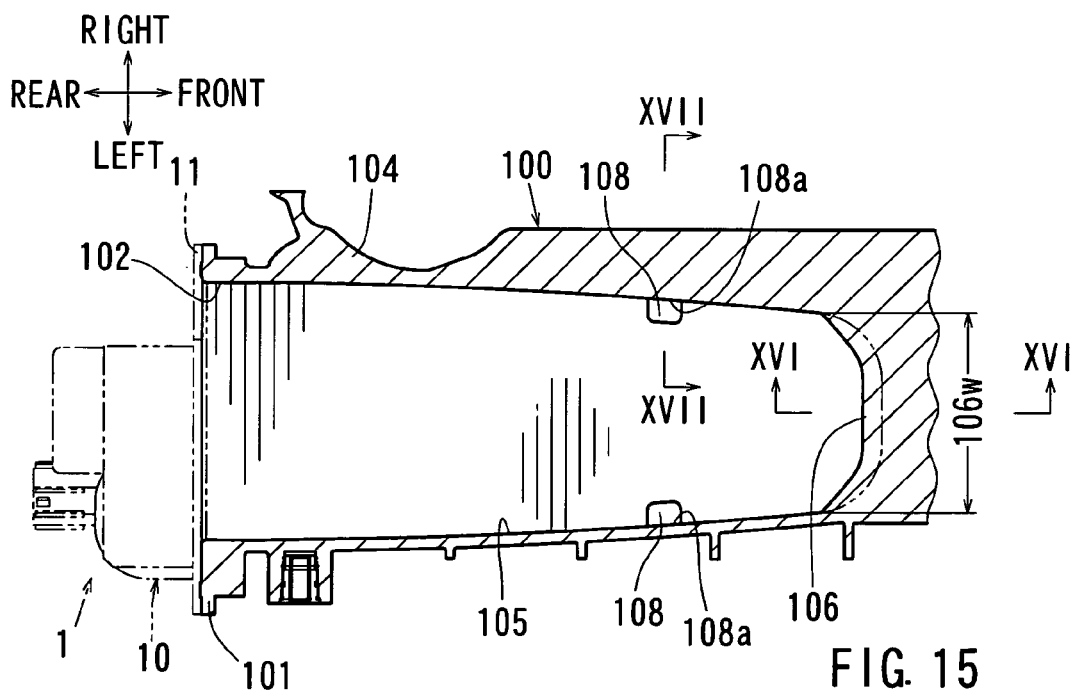
FIG. 15 is a cross sectional view taken along line XV—XV in FIG. 13.
Figure 16:
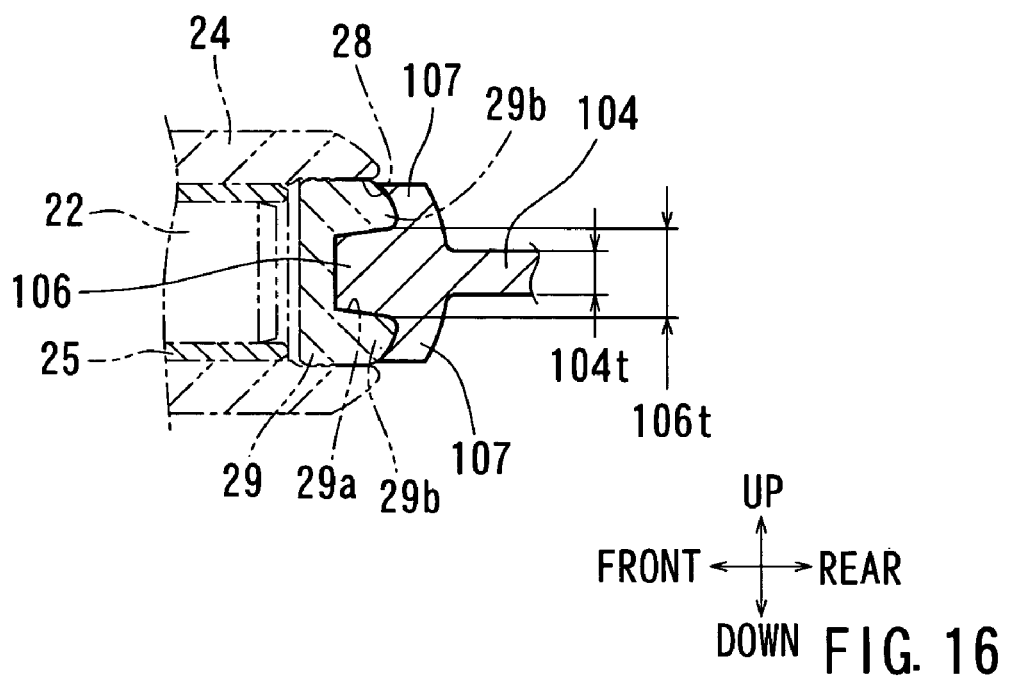
FIG. 16 is a cross sectional view taken along line XVI—XVI in FIG. 15.

As shown in FIG. 16, the projection 106 has a thickness 106t that is larger than the thickness of the partition wall 104. In addition, the thickness 106t of the projection 106 decreases in the protruding direction (rearward direction). Upper and lower flanges 107 extend outward (away from a horizontal centerline of the projection 106) and rearward from the base portion of the projection 106, and are configured to be symmetrical to each other. The width in the right and left directions of the upper and lower flanges 107 is substantially the same as the width 106w (see FIG. 15) of the projection 106.

Figure 17:
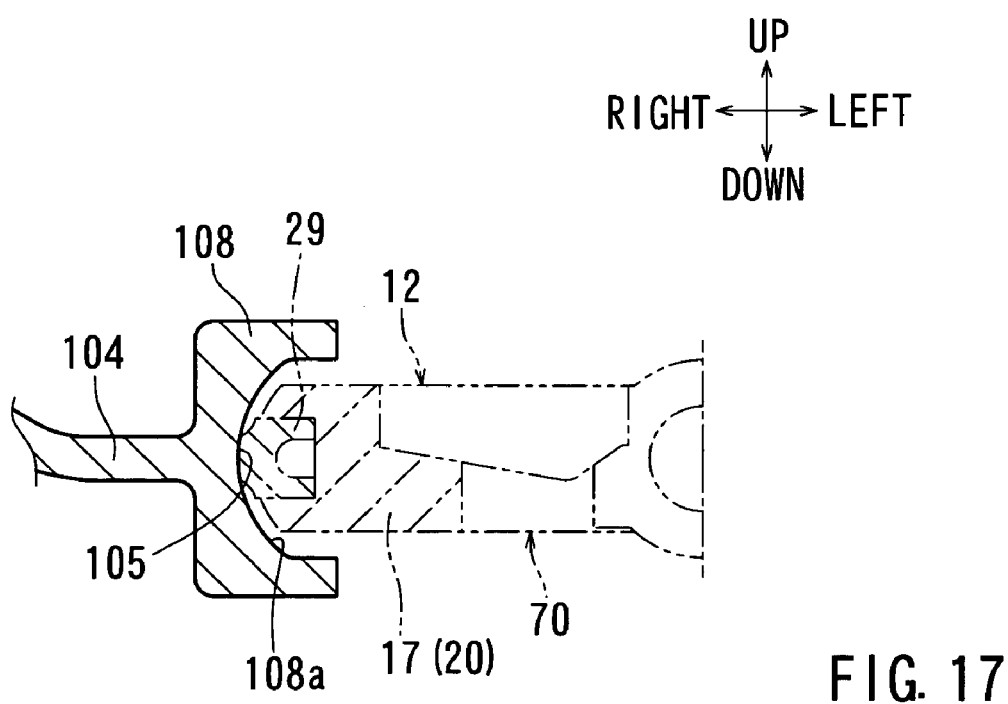
FIG. 17 is a cross sectional view taken along line XVII—XVII in FIG. 15.

As shown in FIG. 15, a right and left pair of upper and lower guide portions 108 extend from the right and left walls of the cutout recess 105. The guide portions 108 are positioned on the middle portions of the front side of the right and left walls. The right and left guide portions 108 are symmetrical to each other. The upper and lower guide portions 108 are symmetrical to each other. As shown in FIG. 17, each of the guide portions 108 defines a channel 108a that is adapted to receive a corresponding frame portion 17(20) of a valve member 70. As shown in FIG. 15 and FIG. 17, a portion of the wall between the upper and lower guide portions 108, on the right and left walls of the cutout recess 105, is formed so as to be continuous with the wall surface of the cutout recess 105 to the front and rear of the guide portions 108.

Figure 1:
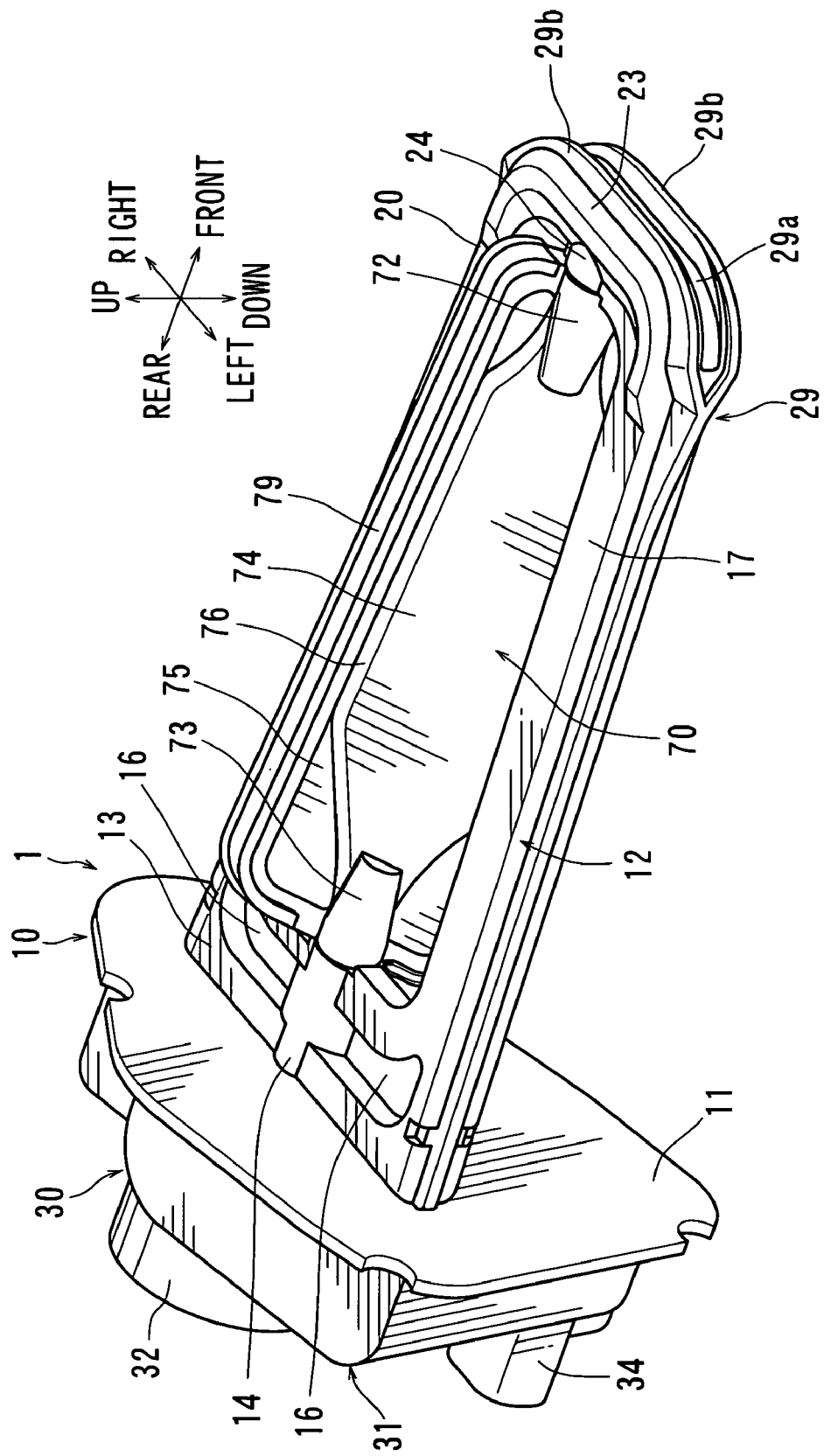
FIG. 1 is a perspective view of an intake air control device according to a first representative embodiment.
Figure 2:
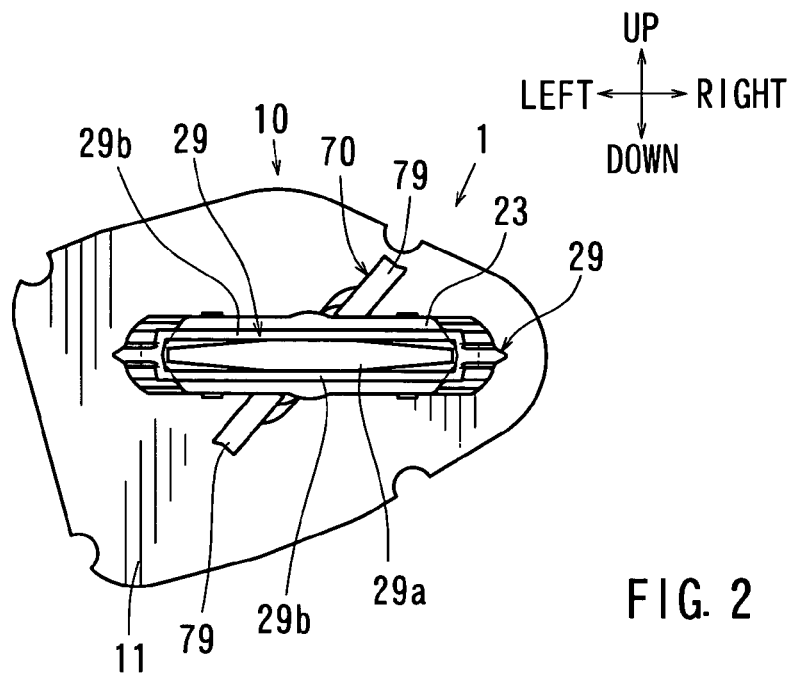
FIG. 2 is a front view of the valve device.
Figure 3:
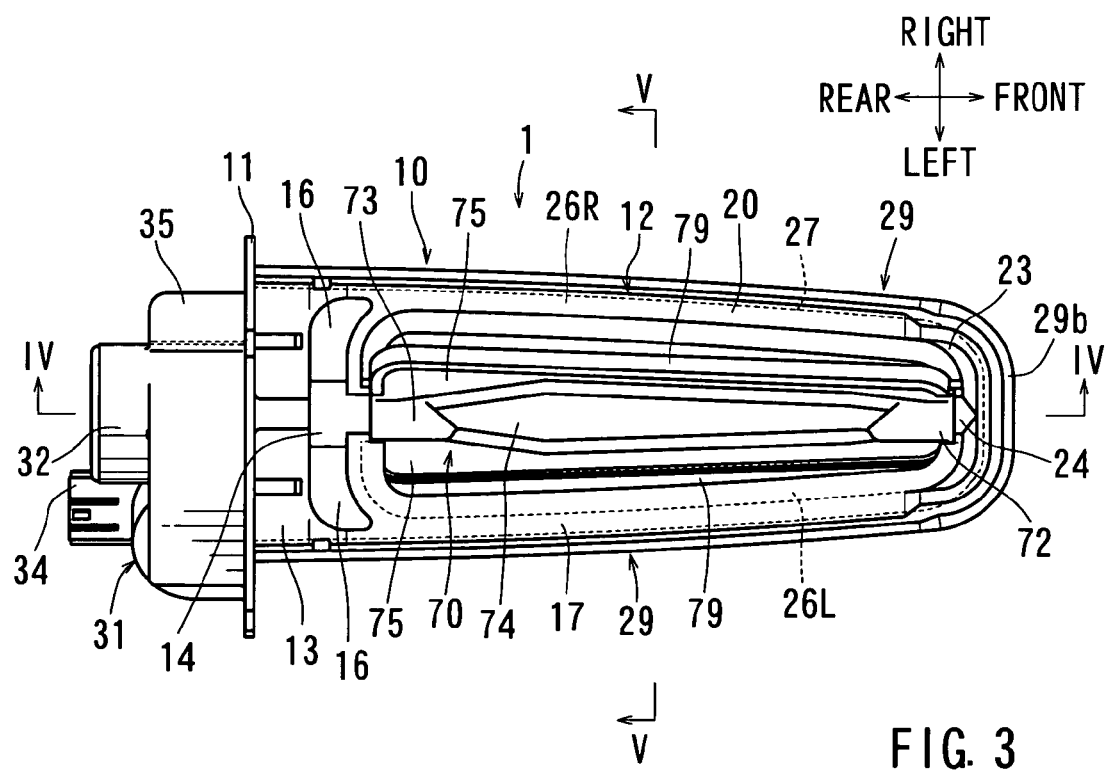
FIG. 3 is a plane view of the valve device.

The valve device 1 will now be described. As shown in FIG. 1, the valve device 1 includes a valve body 10 and a valve member 70 rotatably supported on the valve body 10. An electric motor 30, configured as a DC torque motor, is integrated with the valve body 10. The motor 30 rotates the valve member 70 for opening and closing operations of the valve device 1. First, the valve body 10 will be described. The valve body 10 may be made of resin and has a vertical base plate 11, a frame 12, and a motor housing 31 that are formed integrally with one another. The frame 12 extends horizontally from the front surface of the base plate 11. The motor housing 31 is positioned on the rear side of the base plate 11. Thus, the base plate 11 is positioned between the frame 12 and the motor housing 31. A portion of the base plate 11 extends outward beyond the motor housing 31 and serves as a mounting flange for mounting the valve body 10 to the surge tank 100 (see FIGS. 13 to 15).

Figure 6:
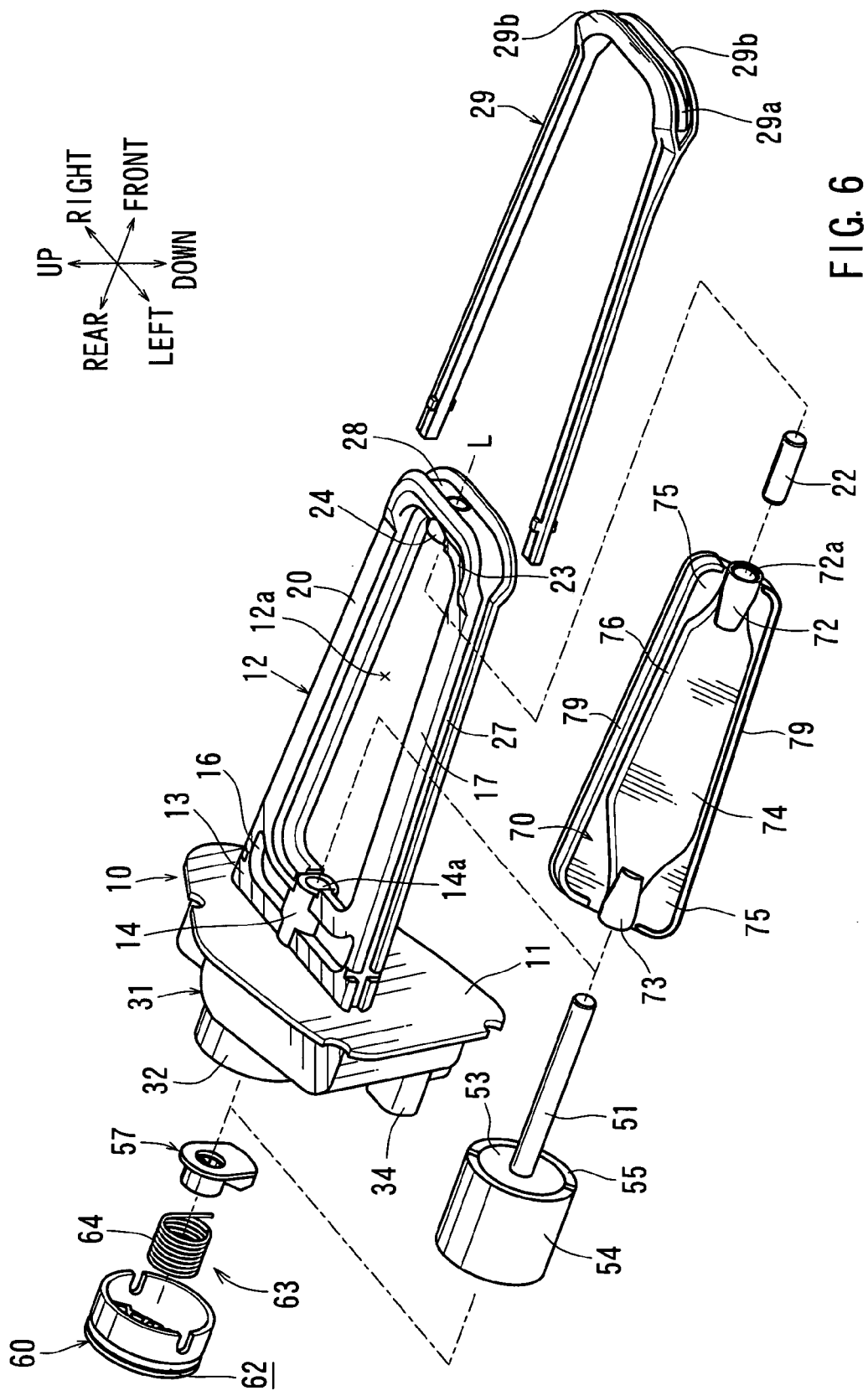
FIG. 6 is an exploded perspective view of the valve device.
Figure 7:
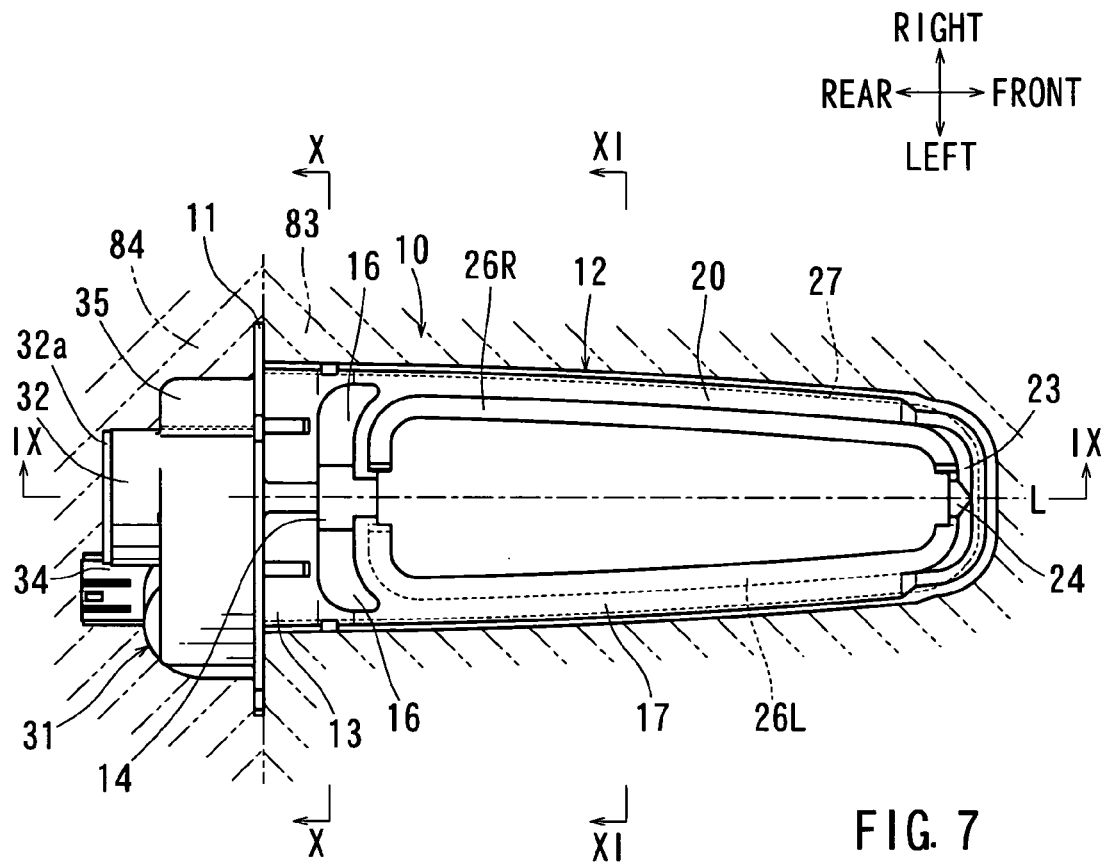
FIG. 7 is a plan view of a valve body.

As shown in FIGS. 6 and 7, the frame 12 has a substantially rectangular configuration elongated in the forward and rearward directions and is fitted into the valve insertion hole 102 and the cutout recess 105 (see FIG. 15). The frame 12 has a rear frame portion 13 (on the side of the motor 30) connected to the base plate 11, a left frame portion 17 and a right frame portion 20 respectively extending forward from the left and right ends of the rear frame portion 13, and a front frame portion 23 (on the side opposite to the motor 30) connected to the front ends of the left and right frame portions, 17 and 20. The distance between the left and right frame portions gradually decreases in the forward direction. As a result, the frame 12 has a tapered configuration in the forward direction.

Figure 8:
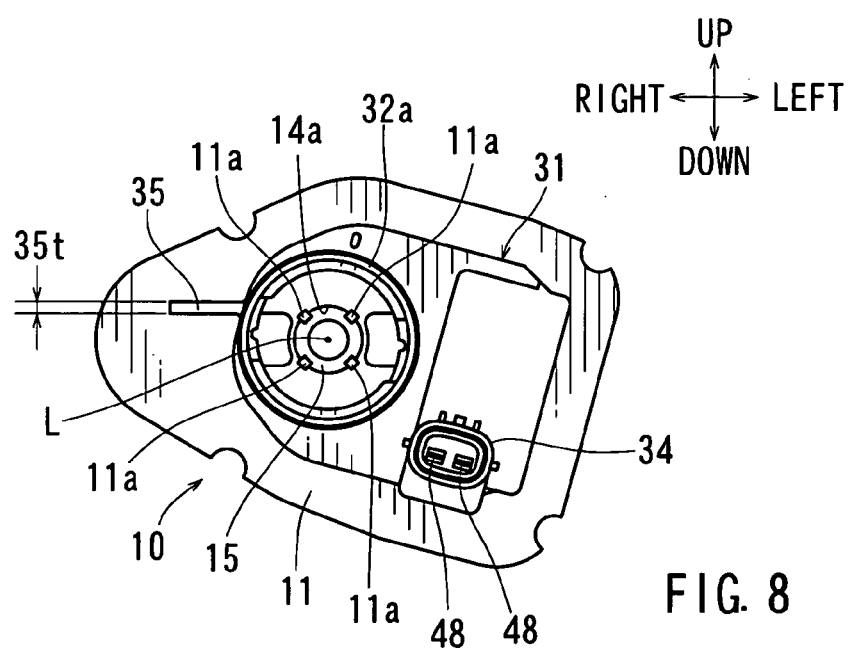
FIG. 8 is a rear view of the valve body.
Figure 9:
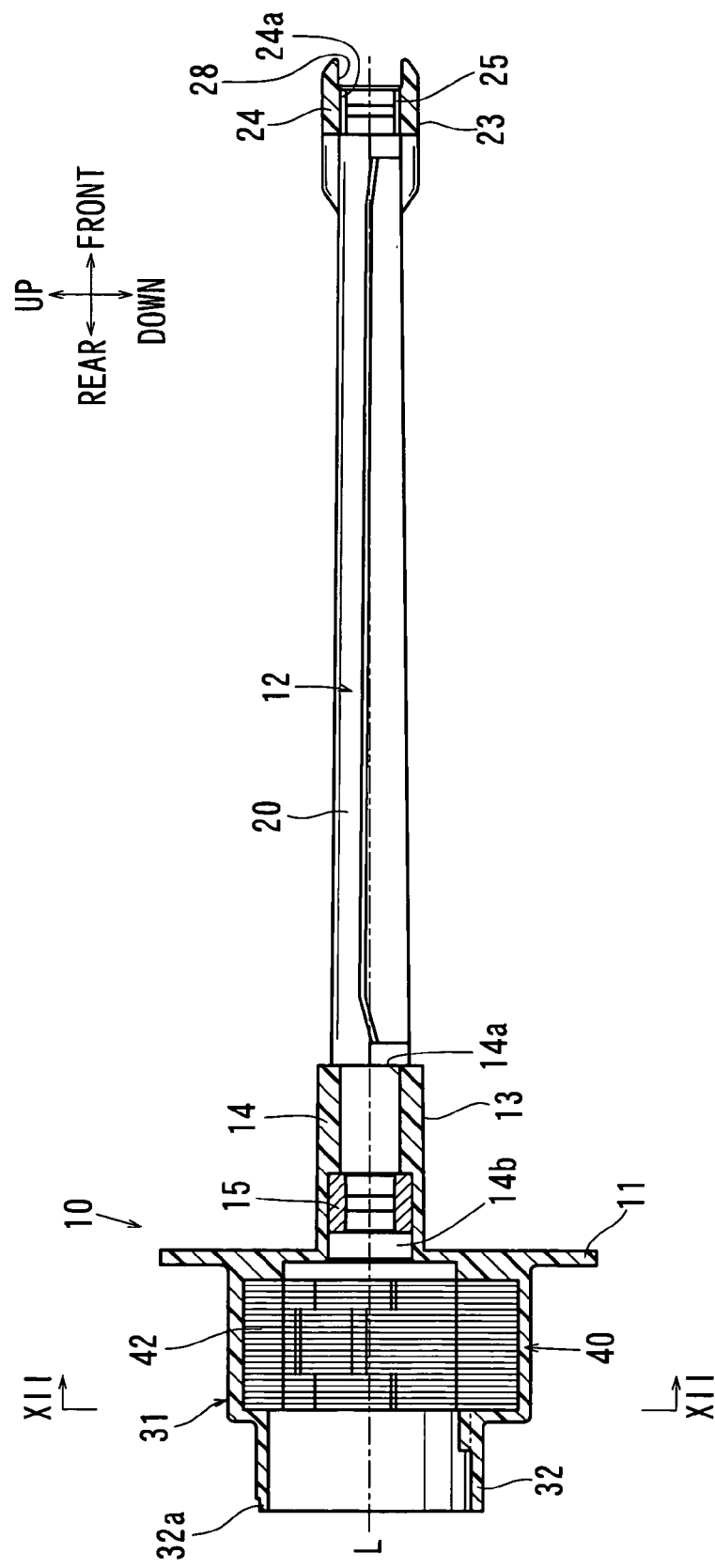
FIG. 9 is a cross sectional view taken along line IX—IX in FIG. 7.

The rear frame portion 13 of the frame 12 is configured as a substantially linear strip extending in the right and left directions. A cylindrical support portion 14 is formed in the middle portion between the right and left ends of the rear frame portion 13. The support portion 14 has a central axis L along the forward and rearward directions. As shown in FIG. 9, a support hole 14a is formed in the support portion 14 and extends through the support portion 14 in an axial direction. In other words, the support hole 14a extends through the rear frame portion 13. The support hole 14a further extends through the base plate 11 and opens into a tubular portion 32 of the motor housing 31. A bearing bush 15 is press-fitted into the support hole 14a from the rear side of the support hole 14a. In addition as shown in FIG. 8, the support portion 14 is heated and crimped at suitable circumferential points 11a (four points 11a are shown in this representative embodiment) in position axially adjacent to the open end of the support hole 14a on the side of the base plate 11. Consequently, the bearing bush 15 is staked or is prevented from being removed from the support hole 14a. In order to accommodate the staking procedure, a space 14b is defined within the support hole 14a between the rear facing open end of the support hole 14a and the fitted position of the bearing bush 15 (see FIG. 9).

Figure 10:
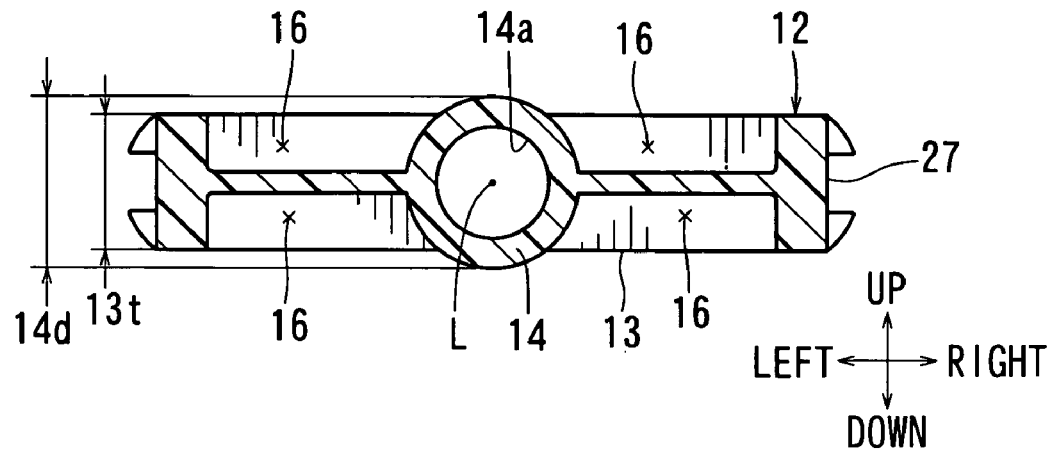
FIG. 10 is a cross sectional view taken along line X—X in FIG. 7.

As shown in FIG. 10, the rear frame portion 13 has a thickness 13t that is slightly smaller than a diameter 14d of the support portion 14. Although the thickness 13t is smaller than the diameter 14d in this representative embodiment, the thickness 13t may be equal to or greater than the diameter 14d. More importantly, the cross sectional configuration of the rear frame portion 13 is designed to fit within the valve insertion hole 102 of the surge tank 100 (see FIG. 15). In particular, the rear frame portion 13 is molded such that the thickness 13t is greater than a diameter of a rotor shaft 51 (see FIG. 6) that will be explained later.

Four thickness reduced portions 16, configured as recesses, are formed in the rear frame portion 13 and arranged symmetrically to each other with regard to the right and left directions and the upper and lower directions. The thickness reduced portions 16 extend along the length (right and left directions) of the rear frame portion 13 except for the support portion 14, right and left ends, and forward and rearward ends of the frame portion 13. In this way, the thickness of the rear frame portion 13 is reduced at regions where the upper and lower thickness reduced portions 16 are opposed to each other.

Figure 4:
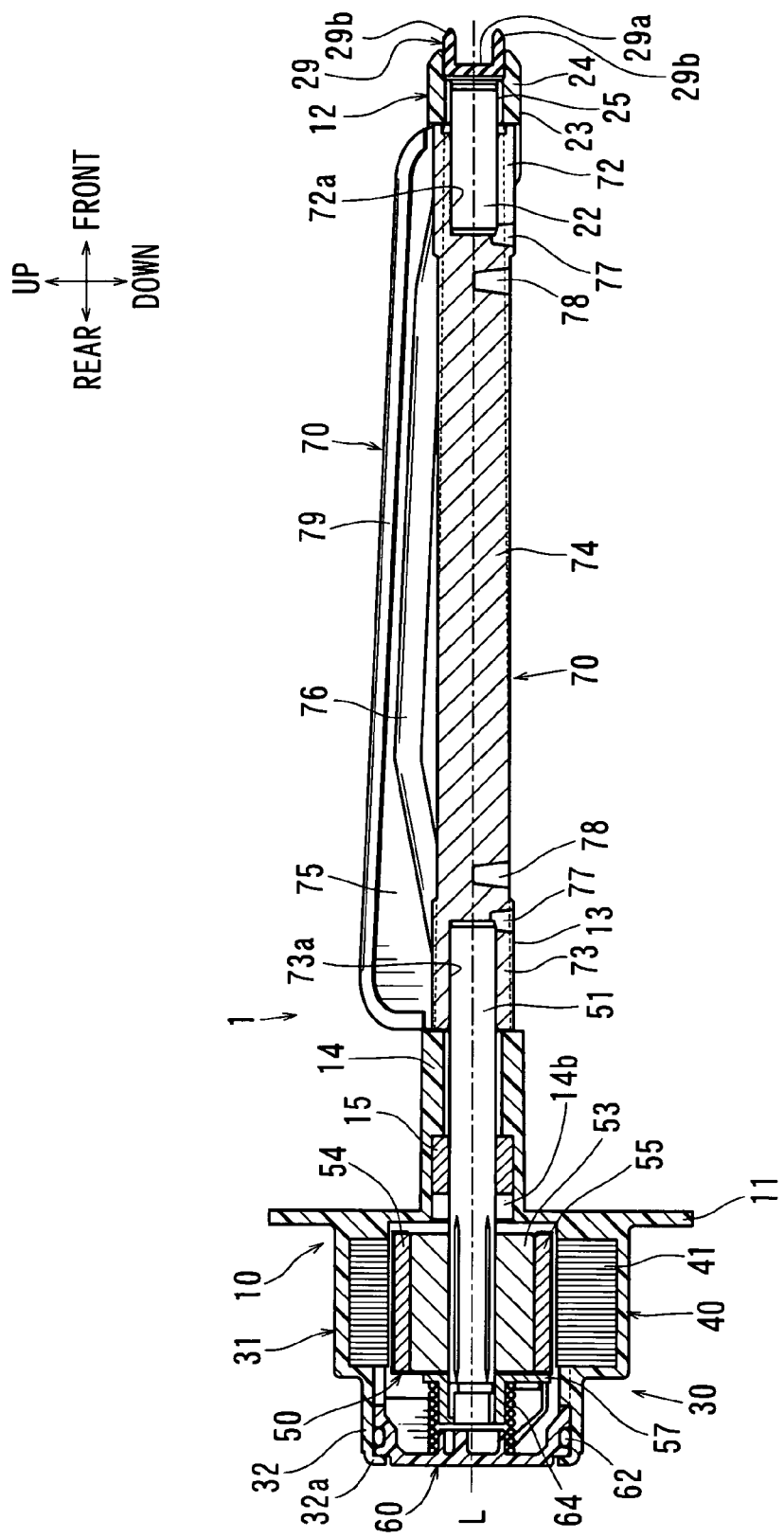
FIG. 4 is a cross sectional view taken along line IV—IV in FIG. 3.

As shown in FIGS. 6 and 7, the front frame portion 23 extends in the right and left directions. A substantially cylindrical support portion 24 is formed at the central position of the front frame portion 23 (with regard to the right and left directions) and has a central axis coincident to axis L of the cylindrical support portion 14 of the rear frame portion 13. As shown in FIG. 9, a support hole 24a is formed in the support portion 24 and extends through the support portion 24 in the axial direction. A bearing bush 25 is press fitted into the support hole 24a from the rear side of the support hole 24a. As shown in FIG. 4, one end (the front end as viewed in FIG. 4) of a support shaft 22 is inserted into the bearing bush 25, so that the bearing bush 25 rotatably supports the support shaft 22. The other end (the rear end) of the support shaft 22 is press-fitted into an axial hole 72a formed in the front portion of the valve member 70.

Referring to FIG. 6, the left frame portion 17, the right frame portion 20, and the front frame portion 23 may have a thickness that is substantially the same as the thickness 13t (see FIG. 10) of the rear frame portion 13. However, because the front frame portion 23 has an engaging recess 28 formed in the outer periphery, the front frame portion 23 may have a thickness greater than the thickness 13t. The engaging recess 28 will be explained later.

As shown in FIG. 7, a left valve seat 26L and a right valve seat 26R are formed in a stepped manner on the inner periphery of the frame 12, with an exception for the areas around the support portions 14 and 24. The front and rear ends of each of the left and right valve seats 26L and 26R are curved toward the central axis L. More specifically, the left and right valve seats 26L and 26R are symmetrical about a point that corresponds to the central axis L as viewed from the forward and rearward directions (see FIG. 11). Thus, the left valve seat 26L is oriented downward and the right valve seat 26R is oriented upward.

As shown in FIG. 6, a substantially U-shaped engaging recess 27 is formed in the outer periphery of the frame 12, along the outer peripheries of the frame portions 13, 17, 20, and 23, (see FIGS. 10 and 11) and is open to the outside. Thus, the engaging recess 28 formed in the front frame portion 23 is defined as a part of the engaging recess 27. The width of the engaging recess 28 is greater than the width of the remaining parts of the engaging recess 27 formed in the left and right frame portions 17 and 20 (see FIG. 6). The engaging recess 28 extends across the support portion 24 and communicates with the support hole 24a formed in the support portion 24 (see FIG. 9). The engaging recess 28 is adapted to receive the projection 106 of the surge tank 100 with the intervention of a gasket 29 (see FIG. 16) as will be hereinafter explained.

Figure 5:
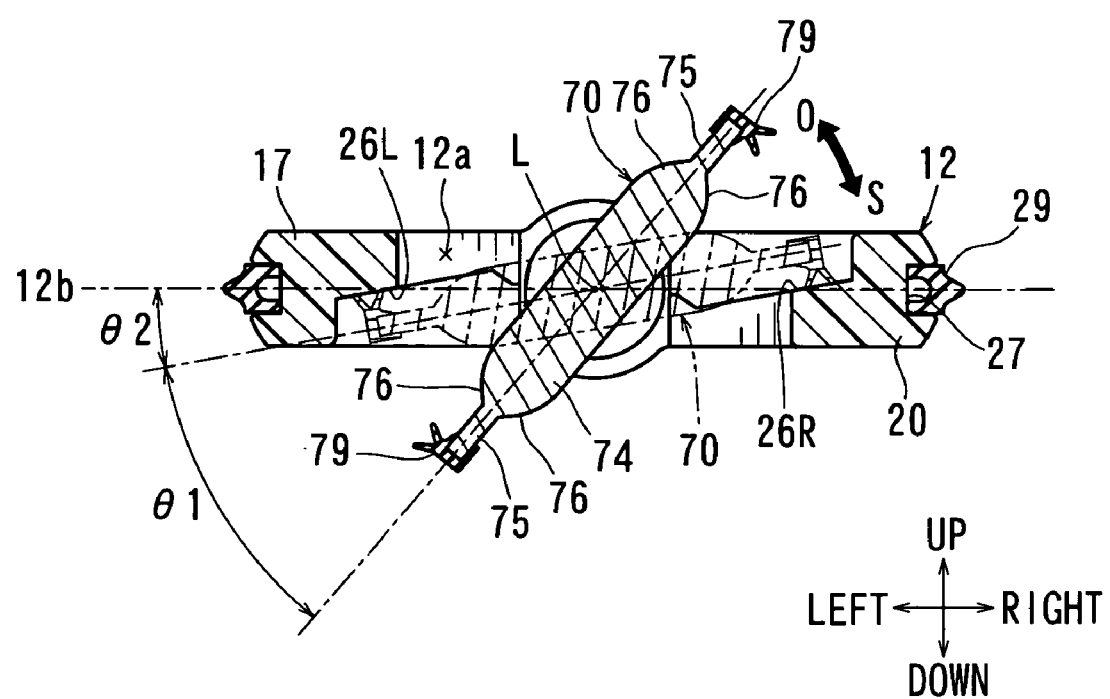
FIG. 5 is a cross sectional view taken along line V—V in FIG. 3.

The gasket 29 is made of a resilient material, such as a rubber, and extends linearly continuously along the engaging recess 27, including the engaging recess 28, and has an inner portion fitted into the engaging recess 27 (see FIGS. 1 to 5). The outer portion of the gasket 29 extends outwardly from the outer periphery of the frame 12 as shown in FIG. 5 and resiliently contacts with the peripheral edge of the cut-out recess 105 formed in the partition wall 104, and with the right and left edges of the valve insertion hole 102 of the surge tank 100 (see FIG. 15). The gasket 29 provides a seal between the frame 12 and the partition 104 (see FIG. 17).

As shown in FIG. 6, a portion of the gasket 29, corresponding to the front frame portion 23 of the frame 12, is configured to define an engaging recess 29a that is open on the front side. In addition, engaging walls 29b are formed on the upper and lower side of the engaging recess 29a. The engaging recess 29a resiliently engagingly receives the projection 106 of the surge tank 100. At the same time, the engaging walls 29b resiliently contact with the corresponding upper and lower flanges 107 of the partition wall 104 (see FIG. 16).

Figure 12:
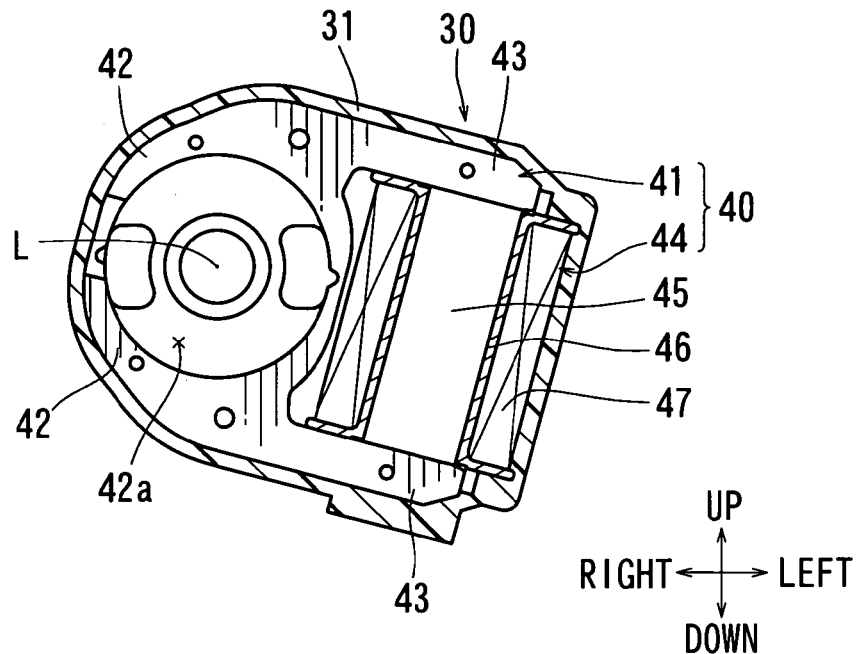
FIG. 12 is a cross sectional view taken along line XII—XII in FIG. 9.

As shown in FIGS. 6 and 7, the motor housing 31 is formed integrally with the rear surface of the base plate 11. As shown in FIG. 12, a stator 40 is integrated within the motor housing 31 via an insertion molding process. The stator 40 has a stator core 41 made of magnetic material. The stator core 41 includes a pair of teeth 42 and a pair of arms 43. The arms 43 magnetically connect the respective teeth 42 to the coil assembly 44. The coil assembly 44 includes an iron core 45 and a stator coil 47. The stator coil 47 is wound around the core 45 with the intervention of a bobbin 46. As shown in FIG. 8, terminals 48, electrically connected to the stator coil 47, are integrated within a connector 34 by an insertion molding process. The connector 34 is molded integrally with the motor housing 31. As shown in FIG. 9, a substantially cylindrical tubular portion 32 is formed on the rear side of the motor housing 31. The tubular portion 32 has a central axis coincident with the central axis L.

Referring to FIG. 4, a rotor 50 in combination with the stator 40 constitutes the motor 30. The rotor 50 has a rotor shaft 51, a rotor core 53 press-fitted onto the rear end of the rotor shaft 51 and fixed in position relative to the rotor shaft 51, and a pair of magnets 54 and 55 attached to the outer periphery of the rotor core 53 (see FIG. 6). The rotor core 53 is made of magnetic material and has a substantially cylindrical configuration. Each of the magnets 54 and 55 has an arc-shaped configuration and is magnetized in the radial direction. In addition, the magnets 54 and 55 are secured to the rotor core 53 with their magnetized directions being opposite to each other, so that N and S poles are formed on the rotor 50. As shown in FIG. 4, a spring guide 57 is engagingly fitted on the rear end of the rotor shaft 51. The spring guide 57 is prevented from being removed from the rotor shaft 51 and from rotating relative to the rotor shaft 51.

As shown in FIG. 4, the front end of the rotor shaft 51 is inserted into the support hole 14a formed in the support portion 14 of the rear frame portion 13 of the valve body 10. The rotor shaft 51 is inserted via the tubular portion 32 of the motor housing 31 (see FIG. 9) and a space 42a formed between the teeth 42 of the stator core 41 (see FIG. 12). As a result, the bearing bush 15 fitted into the support hole 14a rotatably supports the rotor shaft 51. The rear end of the rotor shaft 51 is press-fitted into an axial hole 73a formed in the valve member 70, so that the rotor 51 is joined to the valve member 70. In addition, the magnets 54 and 55 of the rotor 50 are rotatably disposed within the space 42a between the teeth 42 (see FIG. 12).

As shown in FIG. 4, a cover 60 is fitted into the tubular portion 32 of the motor housing 31 via an open end 32a of the tubular portion 32 in order to close the open end 32a. The cover 60 contacts with the inner wall of the tubular portion 32 along a predetermined length. As a result, the cover 60 is prevented from rotating relative to the tubular portion 32. In addition, a part of the tubular portion 32 around the open end 32a is heated and crimped along the entire circumferential length so as to be bent inwardly. Consequently the cover 60 is reliably prevented from being removed from the tubular portion 32. Further, an O-ring 62 is interposed between the outer peripheral surface of the cover 60 and the inner wall of the tubular portion 32 in order to provide a resilient seal therebetween.

A torque spring 64 is interposed between the cover 60 and the spring guide 57 in order to normally bias the rotor 50 in the open direction. Although not shown in FIGS. 1 to 19, stoppers are respectively mounted on the cover 60 and the spring guide 57. The stoppers may engage each other when the valve member 70 has rotated to a predetermined fully opened position. The valve member 70 is subsequently prevented from rotating beyond the predetermined fully opened position due to the engagement of the stoppers. The torque spring 64 and the stoppers constitute a valve returning mechanism 63.

A current may be supplied to the terminals 48 (see FIG. 8) under the control of an ECU (electronic control unit) (not shown), exciting the stator coil 47 of the stator 40 (see FIG. 12). This causes the poles of the rotor 50, produced by the magnets 54 and 55, to be attracted to the corresponding opposing poles of the stator core 41, produced by the excited stator coil 47. As a result, torque is produced to rotate the rotor 50 in a closing direction (a direction indicated by an arrow S in FIG. 5) of the valve member 70 against the biasing force of the torque spring 64. When the supply of the current to the stator coil 47 is interrupted, no torque is produced to rotate the rotor 50 in the closing direction. As a result, the rotor 50 is rotated in the opening direction of the valve member 70 because of the biasing force of the torque spring 64. The state where the current is supplied to the stator coil 47 will hereinafter be called the "ON state" of the motor 30. The state where no current is supplied to the stator coil 47 will hereinafter be called the "OFF state" of the motor 30.

As shown in FIGS. 7 and 8, a plate-like rib 35 is formed on the motor housing 31 and extends along and between the outer surface of the tubular portion 32 and the rear surface of the base plate 11. The rib 35 reinforces the tubular portion 32. A thickness 35t of the rib 35 (see FIG. 8) is set so as to provide a laser transmission factor equal to that of the base plate 11. Therefore, in case that the base plate 11 is laser-welded to the rear wall 101 of the surge tank 100, the laser transmission factor of the base plate 11 can be easily and non-destructively determined by measuring the transmission factor of the rib 35.

The valve member 70 will now be described. Referring to FIG. 6, the valve member 70 may be made of aluminum and may be molded through a die-casting operation. The valve member 70 has a plate-like configuration in order to open and close an opening 12a formed within the frame 12 of the valve body 10. A front cylindrical support portion 72 and rear cylindrical support portion 73 are formed on the front and rear ends of the valve member 70. In an assembled state, the front and rear support portions 72 and 73 have respective axial holes 72a and 73a (see FIG. 4) extending along the central axis L. The support portions 72 and 73 are configured to be symmetrical to each other (see FIG. 4).

As shown in FIG. 4, the rear end of the support shaft 22 is press-fitted into the axial hole 72a of the front support portion 72. On the other hand, the front end of the rotor shaft 51 of the rotor 50 is press fitted into the axial hole 73a of the rear support portion 73. Consequently, the frame 12 of the valve body 10 rotatably supports the valve member 70 in order to open and close the opening 12a of the frame 12 (see FIGS. 1 to 5). The support shaft 22 and the rotor shaft 51 may have approximately the same diameter. The support shaft 22 and the rotor shaft 51 may be made of iron coated with defric coatings in order to improve the wear resistance. In this way, the support shaft 22 is coupled to one end of the valve member 70 on the side opposite to the motor 30 and the rotor shaft 51 is coupled to the other end of the valve member 70 on the side of the motor 30.

As described previously, in the ON state of the motor 30, the valve member 70 rotates in the closing direction (the direction indicated by the arrow S in FIG. 5) together with the rotor 50 (see FIG. 4). The excitation of the stator 40 produces the rotational torque causing the rotation in the closing direction, so that the valve member 70 closes the opening 12a of the frame 12 of the valve body 10. Conversely, when the motor 30 is turned to the OFF state, the valve member 70 rotates in the opening direction (the direction indicated by an arrow O in FIG. 5) together with the rotor 50. The resilient restoring force of the torsion spring 64 causes the rotation in the opening direction, so that valve member 70 opens the opening 12a of the frame 12 of the valve body 10.

In this representative embodiment, the rotational range of the valve member 70 is limited within an angle $\theta 1$ between the fully closed position (indicated by chain lines in FIG. 5) and the fully opened position (indicated by solid lines in FIG. 5). For example, the angle $\theta 1$ may be set to an angle of 40°. In addition, the fully closed position may be set such that the valve member 70 is inclined by an angle θ2 relative to a horizontal reference plane 12b that extends along the central axis L of the frame 12. For example, the angle θ2 may be set to an angle of 10°.

As shown in FIG. 5, the valve member 70 has a large thickness portion 74 extending across the central axis L. Right and left small thickness portions 75 are on both sides of the large thickness portion 74. Each of the large thickness portion 74 and the right and left small thickness portions 75 are configured to be symmetrical with regard to the longitudinal axis of the valve member 70. The right and left small thickness portions 75 have a thickness approximately equal to one-quarter of the thickness of the large thickness portion 74. However, the thickness in the regions of the support portions 72 and 73 (see FIG. 6) may be greater than one-quarter of the thickness of the large thickness portion 74. In addition, the outer surfaces on both sides of the large thickness portion 74 join the corresponding outer surfaces of the right and left small thickness portions 75 via convex curved surfaces 76. Further, the front side curved surfaces 76 converge at a substantially middle position of the front side support portion 72. The rear side curved surfaces 76 converge at a substantially middle position of the rear side support portion 73 (see FIG. 6).

As shown in FIG. 4, air releasing holes 77 are formed in the valve member 70 (on the lower side as viewed in FIG. 4) in communication with axial holes 72a and 73a. The air releasing holes 77 allow the air to be rapidly and smoothly discharged from the axial holes 72a and 73a when the support shaft 22 and the rotor shaft 51 are respectively fitted into the axial holes 72a and 73a. In addition, reference holes 78 are formed in the valve member 70 and are positioned in the vicinity of the respective air releasing holes 77. The reference holes 78 may provide references during the machining operation of the valve member 70. Because the air releasing holes 77 and the reference holes 78 are formed on the lower side of the valve member 70, a side that is typically oriented downward during normal operation, any condensed water or moisture as well as any other foreign particles may not collect within the air releasing holes 77 and the reference holes 78 due at least in part to the effects of gravity.

Right and left members 79 are made of resilient rubber and are attached to the valve member 80 along the outer peripheries of the small thickness portions 75. When the valve member 70 is in the fully closed position (indicated by chain lines in FIG. 5), the left seal member 79 resiliently closely contacts with the left side valve seat 26L of the frame 12. At the same time, the right seal member 79 resiliently closely contacts with the right side valve seat 26R of the frame 12. As a result, the valve member 70 can reliably sealingly close the opening 12a of the frame 12. When the valve member 70 is in an open position, including the fully opened position (indicated by solid lines in FIG. 5), the seal members 79 are positioned away from the respective left and right valve seats 26L and 26R, unrestricting the opening 12a of the frame 12.

The valve device 1 (see FIGS. 1 to 3) may be mounted within the surge tank 100 in the following process. The frame 12 of the valve body 10 is initially inserted into the valve insertion hole 102 (see FIG. 15) with the front frame portion 23 oriented toward the valve insertion hole 102. The frame 12 is then fitted into the cut-out recess 105 of the partition wall 104 of the surge tank 100. The outer periphery of the frame 12 sealingly contacts the inner peripheral edge of the cut-out recess 105 via the gasket 29. At the same time, the engaging recess 28 of the front frame portion 23 of the frame 12 sealingly engages the projection 106 via the engaging recess 29a formed in the gasket 29 (see FIG. 16). Also, the upper and lower engaging walls 29b of the gasket 29 sealingly contacts the corresponding upper and lower flanges 107 of the projection 106. As a result, the vertical movement of the front frame portion 23 may be limited or inhibited. Further, the left frame portion 17 and the right frame portion 20 of the frame 12 engage the corresponding channels 108a of the guide portions 108 of the partition wall 104. The vertical movement of the left frame portion 17 and the right frame portion 20 may be limited or inhibited (see FIG. 17) due to the engagement with the corresponding channels 108a.

Figure 13:
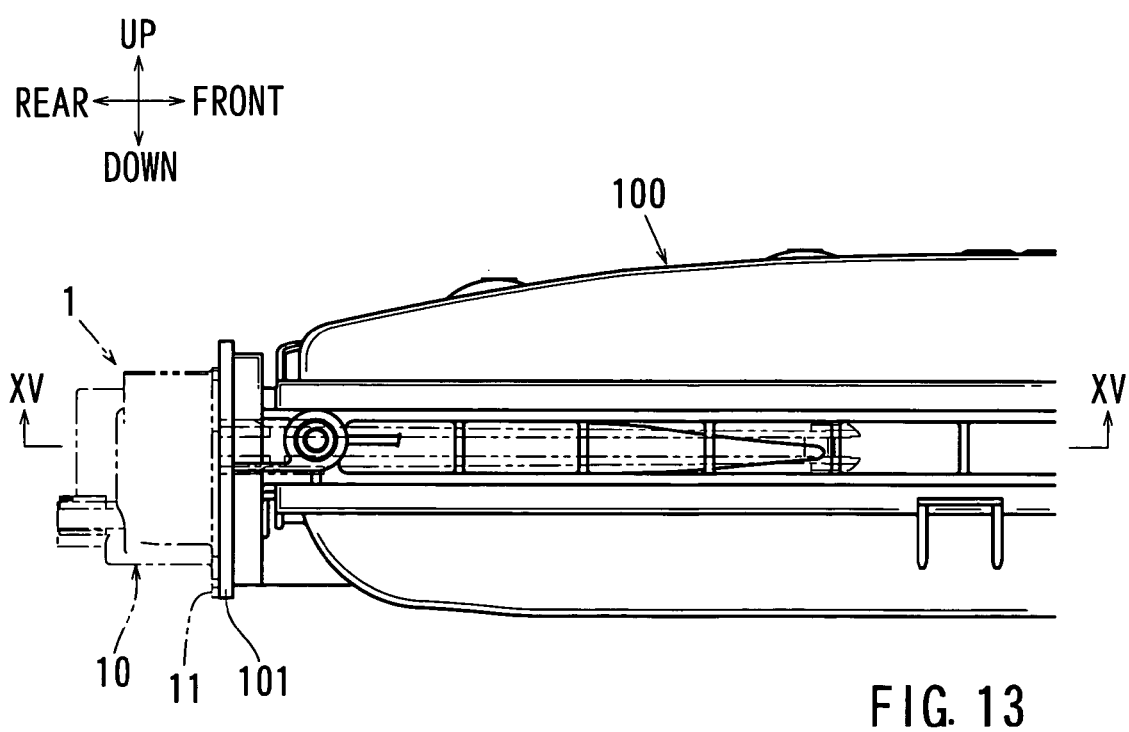
FIG. 13 is a left side view of the valve device and showing a mount region of the valve device on a surge tank.
Figure 14:
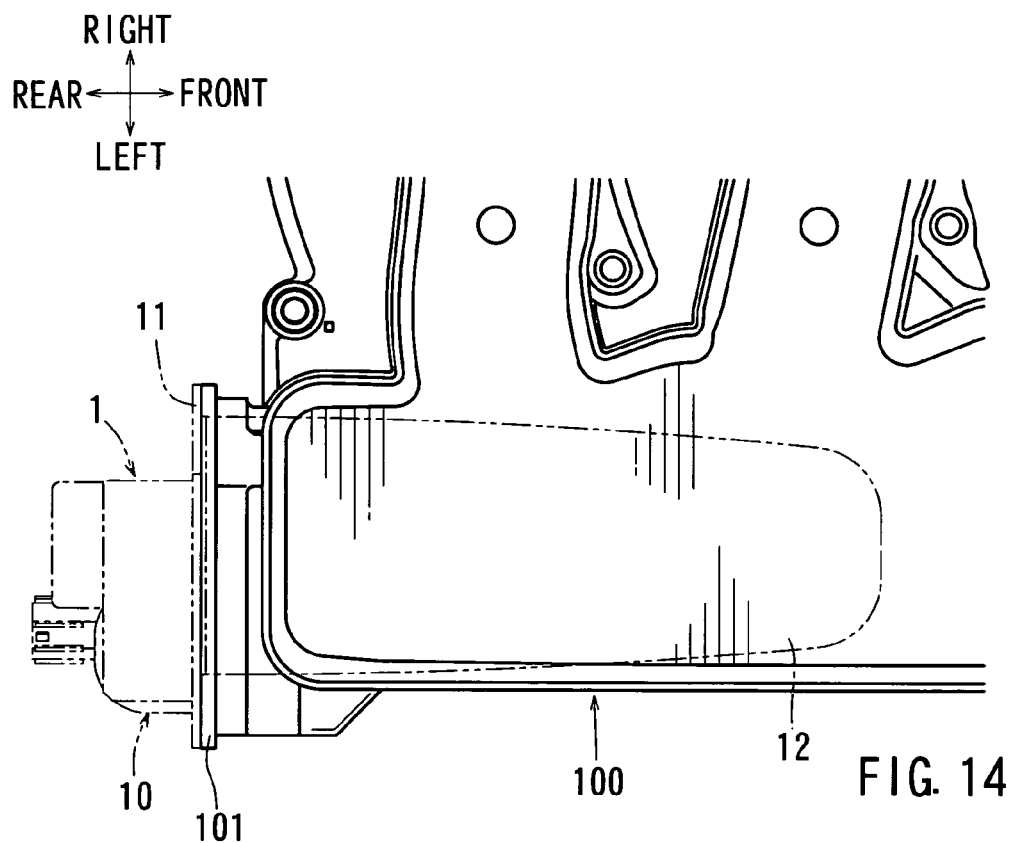
FIG. 14 is a plan view of the valve device and showing a mount region of the valve device on a surge tank.

Next, the base plate 11 of the valve body 10 is joined to the rear wall 101 of the surge tank 100, for example, by laser welding (see FIGS. 13 to 15). The joining is done while the base plate 11 is positioned to closely contact with the rear wall 101 of the surge tank 100. Consequently, the valve insertion hole 102 (see FIG. 15) may be closed. In order to join the base plate 11 to the rear wall, any joining means, such as bonding by adhesives, mechanical fastening, among others, can be used.

In this way, the mounting operation of the valve device 1 on the surge tank 100 may be completed.

According to the valve device 1 of this representative embodiment, the motor 30 is brought to the ON state so as to close the valve member 70 under the control of the ECU during a high-load, low-speed operation of the engine. As a result, due to the inertial force of the intake air, the efficiency of filling the intake air increases. As a result, there may be an increase in torque during the low-speed operation as indicated by the torque line A in FIG. 19. Conversely, during the high-load, high-speed operation of the engine, the motor 30 is brought to the OFF state so as to open the valve member 70, also under the control of the ECU. As a result, due to the inertial force of the intake air, the efficiency of filling the intake air increases, also resulting in an increase in torque during the high-speed operation of the engine as indicated by the torque line B in FIG. 19.

The process of manufacturing the valve device 1 will now be described. The valve body 10 may be molded by resin, for example, by injecting resin into a mold cavity. Prior to the molding step, the stator 40 may be set into the mold, so that the stator 40 is integrated within the valve body 10 by the insertion molding process.

Figure 11:
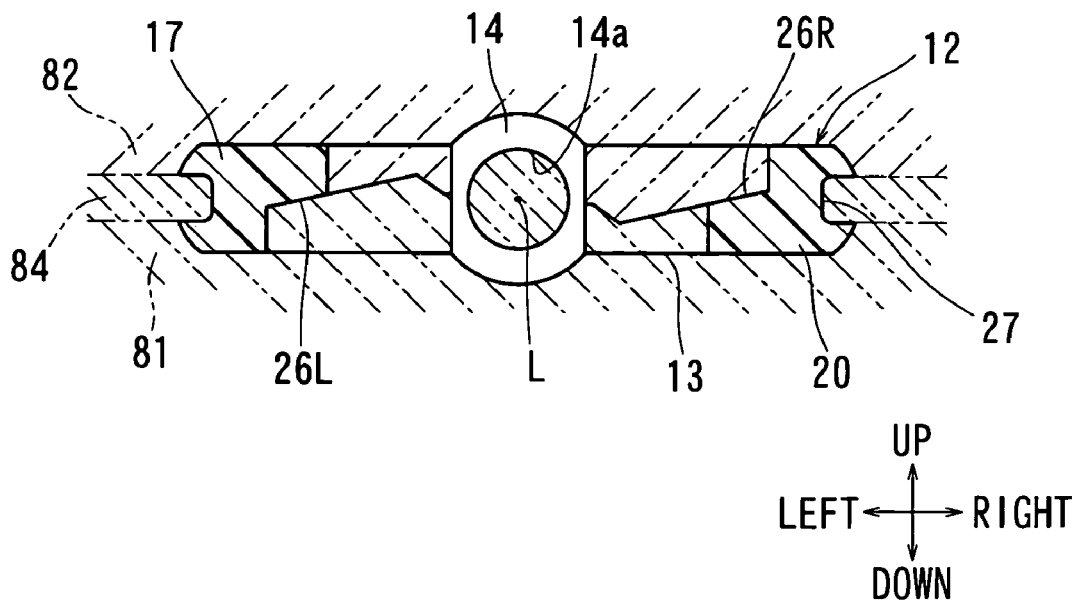
FIG. 11 is a cross sectional view taken along line XI—XI in FIG. 7.

A preferred embodiment of the mold for manufacturing the valve body 10 will now be described with reference to FIGS. 7 and 11. Referring to FIG. 11, the mold includes a lower main mold part 81 and an upper main mold part 82. In addition, the mold includes a front auxiliary mold part 83 and a rear auxiliary mold part 84 (also see FIG. 7). The front auxiliary mold part 83 is adapted to mold the rear part of the rear frame portion 13, including part of the front surface of the base plate 11, the fitting recess 27 of the frame 12, and the support hole 24a of the frame 12. To this end, the front auxiliary mold part 83 is movable in the forward and rearward directions. The lower main mold part 81 is adapted to mold the lower half of the frame 12 and is movable in the vertical direction. The upper main mold part 82 is adapted to mold the upper half of the frame 12 and is movable in the vertical direction. The rear auxiliary mold part 84 is adapted to mold the motor housing 31, including the rear surface of the base plate 11 and the support hole 14a, and is movable in the forward and rearward directions. Although not shown in the drawings, an inlet for pouring the molten resin into the mold cavity is formed in the rear auxiliary mold part 84. The individual elements 81, 82, 83, and 84, of the mold may be moved by means of suitable drive devices, such as hydraulic cylinders and motors, or they may be manually moved.

The process of manufacturing the valve body 10 by utilizing the above mold will now be described. The stator 40 is set into the rear auxiliary mold part 84 with the individual parts 81, 82, 83, and 84 of the mold opened. Mold parts 81, 82, 83, and 84, are then closed to define the mold cavity. The molten resin is poured into the mold cavity via an inlet formed in the rear auxiliary part 84 and is then allowed to cool. After the cooling step the stator 40 is integrated with the valve body 10 by the resin that forms the valve body 10. When the molten resin has sufficiently cooled, the mold parts 81, 82, 83, and 84 are opened, and the molded valve body 10 is removed from the mold. The insertion molding process is then completed. Thereafter, the bearing bushes 15 and 25 are respectively press-fitted into the support holes 14a and 24a. As described previously, the support portion 14 may be heated and crimped at a position around one end of the support hole 14a on the side of the base plate 11 in order to prevent the bearing bush 15 from being inadvertently removed from the support portion 14 (see FIG. 8).

Also as described previously, the valve member 70 may be manufactured by a aluminum die-casting operation. After which the surfaces of the small thickness portions 75 of the cast valve member 70 may be treated or coated with suitable coating materials. The seal member 79 is then attached to the outer peripheries of the small thickness portions 75, preferably by an insertion molding process.

The valve member 70 is subsequently positioned within the opening 12a of the frame 12 of the valve body 10. The support shaft 22 is press-fitted into the axial hole 72a of the front side support portion 72 via the axial hole 24a of the front frame portion 23 and the space within the bearing bush 25. The rotor shaft 51 of the rotor 50 is press-fitted into the axial hole 73a of the support portion 13 via the space within the tubular portion 32 of the valve body 10, the support hole 14a of the rear frame portion 13, and the space within the bearing bush 15.

Thereafter, the cover 60, having the torque spring 64 mounted thereon, is fitted into the tubular portion 32 along a predetermined axial length. The tubular portion 32 is heated and crimped preferably along the entire circumferential length at the open end 32a of the tubular portion 32 in order to prevent the cover 60 from being inadvertently removed.

Finally, the gasket 29 is fitted into the engaging recess 27 of the frame 12 of the valve body 10. The fitting of the gasket 29 completes the manufacturing operation of the valve device 1 (see FIGS. 1 to 3).

According to the valve device 1 of the representative embodiment, the stator 40 of the motor 30 is excited by a supply of current and is integrated within the valve body 10 by the insertion molding process. Separate fixing devices, such as screws, are not required. In addition, a separate motor housing in addition to the valve body 10 is not required. Therefore, the number of parts and the number of assembly steps can be reduced or minimized so as to reduce the manufacturing costs. In addition, by reducing the number of parts, the valve device 1 may have a relatively light-weight construction.

By setting the thickness 13t (see FIG. 10) of the rear frame portion 13 (the rear from portion 13 includes the support portion 14 for rotatably supporting the rotor shaft 51 that is connected to the support portion 73 of the valve member 70 disposed on the side of the motor 30) to be equal to or greater than the diameter 14d of the support portion 14 (although a smaller thickness is shown in FIG. 10), the supporting strength of the entire frame 12 as well as the strength of support portion 14 can be improved.

The molten resin that forms the rear frame portion 13 can uniformly flow during the molding process due in part to the thickness reduced portions 16 that are formed in the end portion on the side of the motor 30 of the rear frame portion 13. Therefore, undesired production of molding stresses and strains, such as surface sinks caused by thermal contractions, can be reduced or minimized. As a result, there is an improvement in the accuracy and precision of the size and dimensions of the molded valve body 10.

The front frame portion 23 of the frame 12 of the valve body 10 (the front frame portion 23 includes the support portion 24 for rotatably supporting the support shaft 22, which is connected to one end of the valve member 70 on the side opposite to the motor 30) engages the projection 106 located at the innermost position of the cut-out recess 105 formed in the partition wall 104 (see FIG. 16). The partition wall 104 can therefore reliably and stably support the front frame portion 23.

The projection 106 of the partition wall 104 has the thickness 106t that is may be greater than the thickness 104t of the partition wall 104 (see FIG. 16). The supporting strength of the projection 106 can be improved due to the use of the greater thickness 106t. As a result, the stress applied to the projection by the pulsating pressure of the intake air can be effectively accommodated.

The projection 106 has a width 106w along the length of the front frame portion 23 (see FIG. 15). Consequently, the width 106w enables further improvement in the supporting strength of the projection 106 so as to increase the reliable support of the front frame portion 23.

Potential leakage of air via the support hole 14a of the rear frame portion 13 (see FIG. 4), can be reliably prevented due at least in part to the O-ring 62 disposed between the tubular portion 32 of the valve body 10 and the cover 60 mounted to the tubular portion 32. Use of the O-ring 62 in this location allows a reduction in the resistance to the rotational movement of the rotor shaft 51 of the rotor 50 because of the lack of a seal being applied against the rotor shaft 51. The lower resistance to rotational movement of the rotor 51 enables a corresponding reduction in the required torque of the motor 30. For example, in the conventional case that an oil seal is provided between the shaft of a valve member and a fixed member surrounding the shaft, as in Japanese Laid-Open Patent Publication No. 2000-55200, resistance against rotation in either direction may be applied to the shaft by the oil seal. The resistance would typically result in an increased requirement for the torque of the motor. However, according to the representative embodiment, this added resistance is eliminated because the O-ring 62 is disposed between the tubular portion 32 of the valve body 10 and the cover 60.

In this representative embodiment, the rotor shaft 51 of the rotor 50 of the motor 30 or the torque motor is directly connected to the valve member 70. The motor 30 directly drives the valve member 70 (see FIG. 4). Therefore, it is possible to eliminate a vacuum tank, a vacuum switching valve (VSV), and related pipelines that are conventionally required when the valve member is driven by a diaphragm-type negative pressure control device. In addition, no reduction gear mechanism is incorporated between the motor 30 and the valve member 70. The number of parts and the number of assembly steps may be reduced in comparison to a construction in which a diaphragm-type negative pressure control device is incorporated as a drive device or a reduction gear mechanism is incorporated in combination with the motor. As a result, the manufacturing costs can be reduced and the valve device 1 may be designed to be relatively compact in size.

The bearing bush 15 that supports the rotor shaft 51 of the rotor 50 of the motor 30 is positioned in a location adjacent to the rotor core 53, i.e., the location adjacent to the space 14b used for the staking purposes of the bearing bush 15 (see FIG. 4). This position makes it possible to reduce the load applied to the rotor shaft 51 by the bearing bush 15.

A preferred embodiment of a valve returning mechanism 170, which can be advantageously used as the valve returning mechanism 63 of the above representative embodiment, will now be described with reference to FIGS. 20 to FIGS. 23(A), 23(B), and 23(C). In these figures, like members are given the same reference numerals as the above representative embodiment and an explanation of these members may not be repeated.

As described in the above representative embodiment, a valve returning mechanism 63 operates to return the valve member 70 to the fully opened position indicated by the solid lines in FIG. 5. The valve returning mechanism 170 has a torque spring or a return spring 172 that corresponds to the torque spring 64 of the above representative embodiment and functions so as to bias and return the valve member 70 to the fully opened position. More specifically, the return spring 172 is configured as a coil spring. The valve returning mechanism 170 further includes a first support member 173 secured to the rotor shaft 51, and a second member portion 182 formed integrally with the inner wall of the cover 60. The first support member 173 corresponds to the spring guide 57 of the representative embodiment.

The first support portion 173 functions to engage a first end 172a of the coil spring 172. The first support portion 173 also serves as a stopper for limiting the rotation of the rotor shaft 51. As shown in FIG. 21(A), the first support member 173 has a plate-like base 174 that includes a disk-like portion 174e and an extension 174f extending radially from the disk-like portion 174e. A front end 174s of the extension 174f has an arc-shaped configuration with a radius of curvature conforming to the radius of curvature of the inner circumferential wall of the cover 60. FIG. 21(A) shows a plan view of the first support member 173. FIG. 21(B) shows a partially sectional side view of the first support member 173. FIG. 21(C) is a view similar to FIG. 21(B) but showing the state where the first support member 173 is secured to the rotor shaft 51. FIG. 21(D) is an enlarged view of a press-fitting hole 176 that will be explained later.

The disk-like portion 174e has a shaft fixing portion 175 that has a substantially cylindrical configuration coaxial to the disk-like portion 174e. The shaft fixing portion 175 is adapted to be fixed to the rear end of the rotor shaft 51. The shaft fixing portion 175 is configured such that the return spring 172 is fitted around the shaft fixing portion 175. In order to achieve this, the outer diameter of the shaft fixing portion 175 is set to be slightly smaller than the inner diameter of the return spring 172. In addition, the shaft fixing portion 175 has an inner diameter that is substantially equal to the outer diameter of the rotor shaft 51.

As shown in FIG. 21(C), a substantially semi-cylindrical projection 142u is formed integrally with the rear end of the rotor shaft 51. The projection 142u has a diameter equal to the diameter of the rotor shaft 51 and has a central axis co-incident with the rotor shaft 51. A semi-circular stepped surface 142y is formed between the outer peripheral wall of the rotor shaft 51 and a horizontal flat surface 142f that defines the projection 142u. The horizontal flat surface 142f and the stepped surface 142y extend perpendicular to one another. A recess 142m, having a substantially square cross sectional area, is formed in the horizontal flat surface 142f at the boundary between the horizontal flat surface 142f and the stepped surface 142y. As shown in FIGS. 21(A) and 21(D), the press-fitting hole 176 is formed in the shaft fixing portion 175 and has a substantially semi-circular cross section. The projection 142u of the rotor shaft 51 is press-fitted into the press-fitting hole 176. The shaft fixing portion 175 further includes a circular insertion hole 175h, formed coaxially with the press-fitting hole 176, in order to receive the rear end of the rotor shaft 51 adjacent to the projection 142u.

As shown in FIG. 21(D), a plurality of low projections 176t and a plurality of shallow and broad-width recesses 176w are formed to be arranged alternatively along the arc-shaped inner circumferential wall of the press-fitting hole 176 of the shaft fixing portion 175. The projections 176t and the recesses 176w extend throughout the axial length of the press-fitting hole 176. In addition, on both sides of the linear inner wall 176f of the press-fitting hole 176, opposing the vertical flat surface 142f in the assembled condition, two small recesses 176m are formed and extend throughout the axial length of the press-fitting hole 176. The radius of the press-fitting hole 176 at the recesses 176w is greater than the radius of the projection 142u of the rotor shaft 51. Conversely, the radius of the press-fitting hole 176 at the projections 176t is smaller than the radius of the projection 142u of the rotor shaft 51. When the projection 142u of the rotor shaft 51 is press-fitted into the press-fitting hole 176 of the shaft fixing portion 175, the pressing force may be concentrated at the projections 176t of the press-fitting hole 176, resulting in the crushing or deformation of the projections 176t. Breakage of the shaft fixing portion 175 during the press-fitting operation can be reliably prevented due in part to the sacrificial deformation of the projections 176t. In addition, because the small recesses 176m are formed on either end of the linear inner wall 176f of the press-fitting hole 176, acute angled regions are not formed between the liner inner wall 176f and the arc-shaped inner circumferential wall of the press-fitting hole 176. As a result, stress concentration regions are avoided along with associated potential breakage at the boundaries between the liner inner wall 176f and the arc-shaped inner circumferential wall.

Referring to FIGS. 21(A) and 21(B), an axially extending intermediate wall 176b is formed in a substantially central position inside of the shaft fixing portion 175 and defines the linear flat surface 176f and the small recesses 176m. The axial length of the intermediate wall 176b is approximately equal to the axial length of the projection 142u of the rotor shaft 51. The projection 142u may then be press-fitted into the press-fitting hole 176 until the stepping surface 142y contacts the intermediate wall 176b. At the end of the press-fitting of the projection 142u into the press-fitting hole 176, the rear end of the rotor shaft 51 adjacent to the projection 142u may be inserted into the circular insertion hole 175h (see FIG. 21(C)). The first support member 173 is consequently securely joined to the rotor shaft 51 in such a way as to not rotate relative to one another.

As shown in FIG. 21(A) and FIG. 23(A), a spring engaging portion 177 for engaging the first end 172a of the torque spring 172 is formed on the extension 174f. The spring engaging portion 177 has the configuration of a wall having a substantially L-shaped configuration in plan view. The spring engaging portion 177 includes a spring wall surface 177k and a stopper surface 177s extending substantially perpendicular to the spring wall surface 177k. The spring wall surface 177k is positioned opposing the shaft fixing portion 175. The spring wall surface 177*k* functions to engage the first end 172*a* of the torque spring 172. A clearance Sk, slightly greater than the diameter of the wire material of the torque spring 172, is provided between the spring wall surface 177*k* and the shaft fixing portion 175. The spring engaging portion 177 also has a rib 177*r* disposed on the side opposite to the spring wall surface 177*k* in order to provide mechanical strength for the spring engaging portion 177.

With this arrangement, the first end 172*a* of the torque spring 172 is set to be positioned at the shaft fixing portion 175 and is engaged with the spring wall surface 177*k* of the spring engaging portion 177 (see FIG. 23(A)). The first end 172*a* is retained so as to not rotate relative to the rotor shaft 51.

Referring to FIGS. 22(A), 22(B), and 22(C), the second engaging member 182 is shown as being formed integrally with the cover 60. In this embodiment, the cover 60 has a substantially cylindrical tubular portion 183 and a disk-like bottom plate 184 that closes one end of the tubular portion 183. The outer diameter of the tubular portion 183 is set to be slightly smaller than the inner diameter of the open end 32*a* of the tubular portion 32 of the motor housing 31. A circumferential recess 183*m* is formed in the outer surface of the cover 60 in a position adjacent to the bottom plate 184. The circumferential recess 183*m* receives a seal ring 181 that establishes a seal between the tubular portion 32 of the motor housing 31 and the tubular portion 183 of the cover 60.

As shown in FIGS. 22(A) and 22(B), a plurality of short projections 183*t* (four projections 183*t* are provided in this representative embodiment) are formed on the outer peripheral surface of the tubular portion 183 of the cover 60 at regular intervals in a circumferential direction. When the tubular portion 183 is fitted into the tubular portion 32 of the motor housing 31, the projections 183*t* may be crushed or deformed to reliably prevent vibrating movement of the cover 60 within the tubular portion 32. In addition, slots 183*c* (two are shown in this representative embodiment) are formed in the tubular portion 183 to oppose each other in the substantially diametrical direction and extend from the midpoint (as determined in the axial direction) of the tubular portion 183 to the rear open end of the cover 60. Engaging projections (not shown) are formed in the inner wall of the tubular portion 32 of the motor housing 31. The engaging projections engage the respective slots 183. The cover 60 can therefore be reliably held in a desired position with regard to the circumferential direction, relative to the tubular portion 32.

As shown in FIGS. 22(A) and 22(B), a cylindrical positioning protrusion 182*e* is formed on the inner wall of the bottom plate 184 coaxially with the bottom plate 184. The positioning protrusion 182*e* is adapted to be inserted into the torque spring 172. The positioning protrusion 182*e* also maintains the torque spring 172 coaxially with the rotor shaft 51 of the motor 30. For this reason, the diameter of the positioning protrusion 182*e* is set to be slightly smaller than the inner diameter of the torque spring 172. In addition, a V-shaped rib 182*v* is formed inside of the positioning protrusion 182*e* in order to reinforce the strength of the positioning protrusion 182*e*.

A spring support portion 185 and a stopper portion 186 are formed on the inner wall of the cover 60 about the region where the bottom plate 184 is connected to the tubular portion 183. The spring support portion 185 constitutes the second engaging member 182 of the valve returning device 170. The spring support portion 185 and the stopper portion 186 are connected to each other via a flat plate-like rib 188. As shown in FIG. 22(B), the spring support portion 185 has a substantially flat, fan-shaped configuration and provides a spring wall surface 185*f*. The spring wall surface 185*f* opposes the positioning protrusion 182*e* and is adapted to engage a second end 172*b* of the torque spring 172. The spring wall surface 185*f* extends co-planar with the front surface of the plate-like rib 188. The space between the spring wall surface 185*f* and the positioning protrusion 182*e* is set to be slightly greater than the diameter of the wire material of the torque spring 172, so that the torque spring 172 can be located between the positioning protrusion 182*e* and the spring wall surface 185*f* of the spring receiving portion 185.

A vertical recess 185*m* is formed in the spring wall surface 185*f* in a position adjacent to the tubular portion 183 and extends in an axial direction. A column-like retainer 187 is formed on the inner wall of the bottom plate 184 in a position opposite to the vertical recess 185*m*. The height of the retainer 187 is set to be slightly greater than the diameter of the wire material of the torque spring 172. In addition, the free end of the retainer 187 has a turn-back portion (not shown) in order to securely hold the second end 172*b* of the torque spring 172. In addition, the distance between the retainer 187 and the spring wall surface 185*f* of the spring support portion 185 is set to be substantially equal to the diameter of the wire material of the torque spring 172. The second end 172*b* may be reliably held between the spring wall surface 185*f* and the retainer 187.

The stopper 186, formed on the inner wall of the cover 60, has an L-shaped configuration in plan view. The stopper 186 includes a stopper surface 186*u* that extends in an axial direction away from the bottom plate 184. The stopper surface 186*u* is positioned in order to contact the stopper surface 177*s* of the first support member 173 in surface-to-surface contact relationship. As previously described, the first support member 173 is fixed with respect to the rotor shaft 51. Consequently, the rotation of the rotor shaft 51 is stopped when the stopper surfaces 186*u* and 177*s* contact each other. In the second engaging member 182, the stopper portion 186 and the spring support portion 185 are connected to each other via the rib 188. No open space is provided between the stopper portion 186 and the spring support portion 185. For at least this reason, when the second end 172*b* is fitted between the spring support portion 185 and the retainer 187, when the torque spring 172 is placed onto the positioning protrusion 182*e*, the second end 172*b* of the torque spring 172 is accurately positioned because there is no opportunity for the second end 172*b* of the torque spring 172 to enter between the stopper portion 186 and the spring support portion 185.

The assembly process of the valve returning device 170 will now be described. As detailed in connection with the primary representative embodiment, after the valve body 10 has been integrally molded with the stator 40 of the motor 30 by the insertion molding process, the rotor shaft 51 is press-fitted into the axial hole 73*a* of the rear support portion 73. Press-fitting the projection 142*u* of the rear end of the rotor shaft 51 into the press-fitting hole 176 fits the first support member 173 of the valve returning device 170 onto the rear end of the rotor shaft 51.

Subsequently, the torque spring 172 is positioned onto the positioning protrusion 182*e* of the cover 60. The second end 172*b* of the torque spring 172 is assembled between the spring support portion 185 and the retainer 187 so as to be held in this position. The cover 60 is then fitted into the open end 32*a* of the tubular portion 32 of the motor housing 31.

When the cover 60 is assembled, the torque spring 172 is set on the shaft fixing portion 175 of the first support member 173 and the first end 172a of the torque spring 172 is engaged with the spring wall surface 177k of the spring support portion 177 (see FIG. 23(A)). At the same time, the stopper surface 177s is positioned so as to contact the support surface 186u of the stopper portion 186 of the cover 60 (see FIG. 23(B)). In this way, the assembly operation of the valve returning device 170 is completed and the torque spring 172 normally applies a biasing force in a clockwise direction, as indicated by an outline arrow in FIG. 23(B). After the assembly process, the cover 60 may be fixed in position by heating and crimping the tubular member 32a at the open end 32 as described in connection with the primary representative embodiment. The cover 60 may be attached to the open end 32 in other ways as well, such as being welded to the open end 32.

As shown in FIG. 23(B), the stopper surface 186u of the stopper portion 186 of the cover 60 contacts the stopper surface 177s of the first stopper member 173 in surface-to-surface contact relationship. Therefore, the rotation of the rotor shaft 51 in the clockwise direction is inhibited or limited. Consequently, the rotation of the valve member 70 in the same direction is also inhibited or limited and is held in a position indicated by the solid lines in FIG. 5. When the motor 30 rotates the rotor shaft 51 in a counterclockwise direction, as indicated by the solid arrow in FIG. 23(C) against the biasing force of the torque spring 172, the valve member 70 may close as described in connection with the primary representative embodiment.

According to this representative embodiment, the valve returning device 170 is disposed within the motor housing 31 of the motor 30. This allows the valve device 1 to have a relatively compact construction in comparison with a conventional construction in which a valve returning device is located at a separate location from the motor housing.

In addition, the first support member 173 has the stopper surface 177s and the second support member 182 has the stopper portion 186 having the stopper surface 186u. The valve member 70 can therefore be reliably stopped at the fully opened position due to the contact between the stopper surface 177s and the stopper surface 186u. The surfaces contact one another when the valve member 70 is rotated to an open position by the biasing force of the torque spring 172 as a result of an interruption in the supply of current to the motor 30.

According to this representative embodiment, the retainer 187, for retaining the second end 172b of the toque spring 172 in an engaging position with the second support member 182, is formed on the inner wall of the cover 60. The positioning protrusion 182e, for positioning the torque spring 172 in a position axially aligned with the rotor shaft 51 of the motor 30, is also formed on the inner wall of the cover 60. The torque spring 172 can therefore be reliably held in a central location of the cover 60. Further, when the cover 60 is fitted into the open end 32a of the tubular portion 32 of the motor housing 31, the torque spring 172 can easily be assembled to the first support member 173 fixed to the rotor shaft 51.

The above representative valve returning device may be modified in various ways. For example, the configurations of the first support member 173 on the side of the rotor shaft 51 and the second support member 182 on the side of the cover 60 may have different, functionally equivalent configurations other than those described in the representative embodiment. In addition, the torque spring 172 may be replaced with a spiral spring, a leaf spring, or any other type of spring or resilient device.

The primary embodiment and the representative valve returning device have been designed so as to close the valve member 70 when the motor 30 is driven and to return the valve member 70 to the fully opened position by the biasing force of the torque spring 64 (172) when there is an interruption in the supply of current to the motor 30. However, it is possible and within the scope of the current invention to design the valve device 1 such that the valve member 70 is open when the motor 30 is driven and the valve member 70 returns to the fully closed position by the biasing force of the torque spring 64 (172) when the supply of current to the motor 30 has been interrupted.

Furthermore, the although the rotor shaft 51 is directly fitted into the valve member 70, the rotor shaft 51 may be formed as a separate shaft from a valve shaft. The rotor shaft 51 may be connected to the valve shaft via a suitable connecting member.

A preferred embodiment of a motor, which can be advantageously used as the motor 30 of the above primary and preferred embodiments will now be described with reference to FIGS. 24(A) and 24(B) to FIG. 28. In these figures, like members are given the same reference numerals as the above representative embodiment and explanation of these members may not be repeated.

Referring to FIGS. 24(A) and 24(B), a motor 260, for driving the valve member 70 (not shown in FIGS. 24(A) and 24(B)), includes a rotor 262 (corresponding to the rotor 50 of the primary representative embodiment) that has a substantially cylindrical configuration. As shown in FIGS. 24(A) and 24(B), and FIGS. 25(A) to 25(D), the rotor 262 has a rotor core 262a and a surface layer 262p made of permanent magnets attached to the outer circumference of the rotor core 262a. The surface layer 262p is divided into two semi-circular cylindrical sections by a virtual plane extending through the rotational axis of the rotor 262. One of the cylindrical sections of the surface layer 262p is magnetized to N-pole, and the other of the cylindrical sections is magnetized to S-pole. In other words, the section extending over an angular range of 0° to 180° of the surface layer 262p of the rotor 262 is magnetized to a N-pole, and the section extending over an angular range of 180° to 360° (0°) is magnetized to a S-pole. For the illustration purpose, the section magnetized to a N-pole is shown with close hatching liens and the section magnetized to a S-pole is shown without hatching lines.

As shown in FIG. 26(A), a stator 264, corresponding to the stator 40 of the primary representative embodiment, has a stator core 264m including two coil support portions 264s (corresponding to the arms 43 of the primary representative embodiment). A through-hole 264h corresponding to the space 42a of the primary representative embodiment is defined in the stator core 264m in order to receive the rotor 262. As shown in FIG. 26(D), the stator 264 has an iron core 268r and a stator coil 268 in order to produce a magnetic field. The iron core 268r is clamped between the coil support portions 264s from both sides in an axial direction. A front-side recess 264f, having a predetermined width and depth, is formed in the front surface of the stator core 264m and extends along a vertical central line Cx of the stator core 264m so as to perpendicularly intersect the through-hole 264h. Similarly, a rear-side recess 264b, having a width equal to the width of the front-side recess 264f and having a depth slightly greater than the depth of the front-side recess 264f, is formed in the rear surface of the stator core 264m and extends along the vertical central line Cx.

Figure 28:
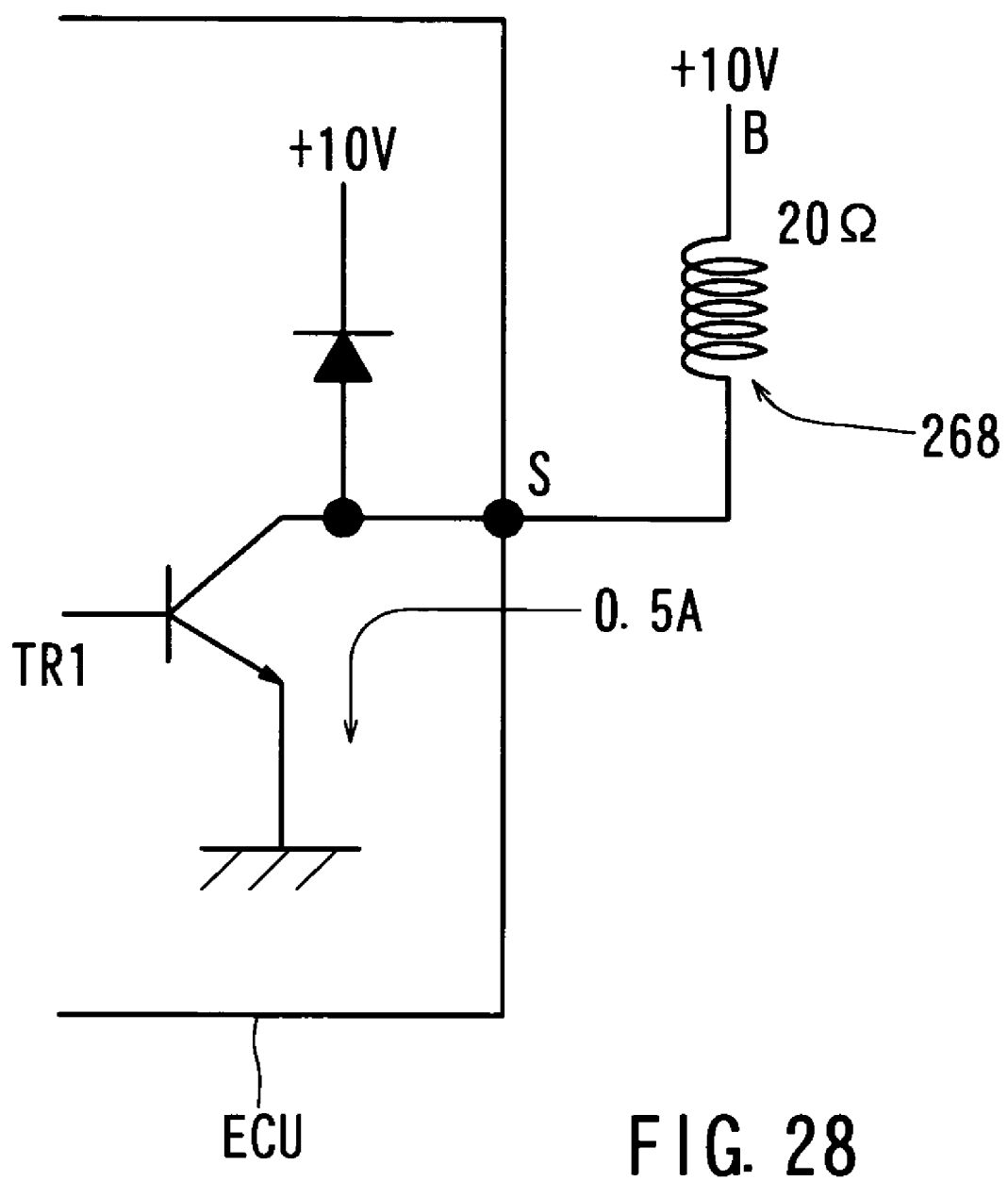
FIG. 28 is a schematic view of an electric circuit of the motor.

As schematically shown in FIG. 28, one end of the stator coil 268 is connected to a power source line B and the other end of the stator coil 268 is connected to a signal line S from the ECU. The ECU has a switching transistor TR1 that turns on and off to respectively supply and interrupt the supply of current to the stator coil 268. In this embodiment, the resistance of the stator coil 268 is set to be 20Ω and the power source voltage is set to be DC10V. Therefore, a current having a value of 0.5 A may flow across the coil 268 when the switching transistor TR1 is turned on. As described in connection with the primary representative embodiment, the connector 34 is formed integrally with the motor housing 31 (see FIG. 8). The stator coil 268 may be connected to the power source line B and the signal line S via the connector 34.

When the stator coil 268 is excited, a magnetic flux may be produced in the stator 264 in a clockwise direction as indicated by arrows in FIG. 26(D). Consequently, the right side of the stator 264, with respect to the front and rear-side recesses 264f and 264b, may constitute a N-pole and the left side of the stator 264 may constitute a S-pole. Because the magnet flux is not able to easily pass through the front and rear-side recesses 264f and 264b, i.e., more specifically, the spaces defined by these recesses, the magnetic flux that flows from the stator core 264m toward the rotor 262 increases in these areas. For this reason, the rotational torque produced by the motor 260 may increase in comparison with a construction in which no front and rear-side recesses are provided.

FIGS. 25(A) to 25(D) show various aspects of production of rotational torque when the motor 260 (i.e., the rotor 262) is respectively positioned at 0°, 90°, 74° and 124° positions. When the rotational angle is 0°, the N-pole and the S-pole of the rotor 262 are respectively positioned on the left side and right side, as shown in FIG. 25(A). In this position, the boundary line between the N-pole and S-pole coincides the vertical central line Cx. The S-pole of the rotor 262 is attracted to the N-pole of the stator 264, and the N-pole of the rotor 262 is attracted to the S-pole of the stator 264. No rotational torque is applied to the rotor 262 and in this position, the rotational torque of the motor 260 is theoretically zero.

FIG. 27(A) is a graph showing the relationship between the rotational angle of the motor (rotor) and the rotational torque. In this graph, a characteristic line Tmu indicates the rotational torque when the current of 0.5 A has been applied across the stator coil 268.

When the rotor 262 has rotated more than an angle of 25° from the 0° position in a clockwise direction, a magnetic force may be produced to return the rotor 262 toward the 0° position. In other words, a rotational torque is produced to rotate the rotor 262 in the counterclockwise direction. As shown in FIG. 27(A), the rotational torque may increase as the rotational angle increases. Theoretically, the rotational torque becomes a maximum when the rotor 262 is in the 90° position, as shown in FIG. 25(B). In the 90° position, a boundary line half way between the boarder line separating the N-pole and S-pole of the rotor 262 coincides with the vertical central line Cx. The repelling force produced between the N-pole of the stator 264 and the N-pole of the rotor 262, and the attracting force produced between the N-pole of the stator 264 and the S-pole of the rotor 262, become substantially equal to one another. These forces act to rotate the rotor 262 in a counterclockwise direction. Similarly, the repelling force produced between the S-pole of the stator 264 and the S-pole of the rotor 262 and the attracting force produced between the S-pole of the stator 264 and the N-pole of the rotor 262 become substantially equal to one another. These forces also act to rotate the rotor 262 in a counterclockwise direction.

Practically however, the rotational torque still gradually increases as the rotational angle increases from an angle of 90° to an angle of about 105°. The result is that the rotational torque becomes a maximum at the 105° position as shown in FIG. 27(A).

As the rotational angle increases to exceed 90°, the boarder line between the N-pole and the S-pole of the rotor 262 dips below the horizontal central line Cy on the N-pole side of the stator 264. The boarder line between the N-pole and S-pole of the rotor 262 becomes higher than the horizontal central line Cy on the S-pole side of the stator 264. Therefore, on the N-pole side of the stator 264, the repelling force between the N-pole of the stator 264 and the N-pole of the rotor 262 increases slightly. The attracting force between the N-pole of the stator 264 and the S-pole of the rotor 262 decreases slightly. As previously described, within the range between an angle of 90° and an angle of about 105°, the rotational torque gradually increases as shown in FIG. 27(A). As the rotational angle exceeds an angle of 105°, the rotational torque decreases relatively rapidly. The rotational torque becomes substantially zero when the rotational angle exceeds an angle of 145°.

In this representative embodiment, the motor 160 is positioned so that during the operation of the motor 160, the rotor 262 rotates within a range of an angle of 74° and an angle of 124°. Therefore, the rotational torque of the motor 160 reaches a maximum during operation. The valve member 70 may be positioned in the fully opened position (indicated by solid lines in FIG. 5) when the rotational angle of the rotor 262 is 124° (θx position shown in FIGS. 27(A) and 27(B)). The valve member 70 may be positioned in the fully closed position (indicated by chain lines in FIG. 5) when the rotational angle of the rotor 262 is 74° (θy position shown in FIGS. 27(A) and 27(B)). When the stator coil 268 is excited, the motor 260 rotates the valve member 70 from the fully closed position to the fully opened position shown in FIG. 5.

The rotational torque of the motor 260 during the rotation from the fully opened position to the fully closed position changes from a value TM1 at θx (124°) position to a value TM2 at θy (74°) position shown in FIG. 27(A). More specifically, the rotational torque gradually increases from the value TM1 to the maximum value TMm, and then gradually decreases to the value TM2. In this embodiment, the value TM2 is greater than the value TM1. In addition, the ratio of increase of the rotational torque within a range between 124° and about 115°, i.e., the range around the θx (124°) position, is smaller than the ratio of decrease of the rotational torque within a range between about 85° and 74°, i.e., the range around the θy (74°) position.

In FIG. 27(A), a characteristic line Tu indicated by a thin solid line represents the characteristics of the torque of the motor 260 in the case where the front and rear-side recesse, 264f and 264b, are not formed in the stator 264. As will be seen from the characteristic line Tu, the rotational torque within the range between 124° and 74° is considerably lower than the rotational torque obtained by the characteristic line Tmu of the current embodiment. In order to obtain the same torque value as the characteristic line Tmu, the size of the stator 264 and the size of the rotor 262 must be increased. However, according to the representative embodiment, it is possible to increase the rotational torque without increasing the size of the motor 262. A dotted line To in FIG. 27(A) indicates the rotational torque when the supply of current to the stator coil 268 of the motor 260 has been interrupted. As shown in FIG. 27(A), the rotational torque becomes substantially zero throughout the range between 124° and 74° in the absence of a supplied electriccurrent.

The torque performance of the torque spring 64 of the primary representative embodiment as well as the torque spring 172 of the representative valve returning device 170 shown in FIGS. 20 to 23(A), 23(B), and 23(C), may be suitably determined in response to the above torque characteristic of the motor 260. Referring to FIG. 27(B), the torque characteristics of the motor 260 is shown on the upper side of a zero level line L. The torque characteristics of the torque spring 64(172) are shown on the lower side of the zero level line L. The ordinate of FIG. 27(B) is determined such that the rotational torque (positive) of the torque spring 64(172) increases in the downward direction from the zero level line L.

In FIG. 27(B), characteristic lines Tmu1, Tmu2, and Tmu3, represent the rotational torque of the motor 260 during operation at a low temperature, a normal temperature, and a high temperature. As seen in FIG. 27(B), the rotational torque of the motor 260 decreases as the temperature increases. The characteristic line Tmu3 at high temperature will be hereinafter also called the "smallest torque characteristic line Tmu3."

In FIG. 27(B), characteristic lines TBu1, TBu2, and TBu3, respectively represent the torque of the torque spring 64(172) or the coil spring when the torque spring 64(172) exhibits a minimum torque, an intermediate torque, and a maximum torque, during the movement of the valve member 70 from the fully opened position to the fully closed position. As the valve member 70 rotates from the fully opened position to the fully closed position, the rotational torque applied by the torque spring 64(172) may increase by a value calculated by the expression "spring constant (k)× amount of displacement (amount of torsion) (x)." The increased value of the rotational torque is calculated by the expression "C1kx=TB2−TB1", where TB1 and TB2 respectively are the rotational torque of the torque spring in the fully opened position and the fully closed position, and C1 is a proportionality constant.

In this representative embodiment, "TM2−TM1" is determined to be greater than the increased value C1kx. In order to rotate the valve member 70 from the fully opened position to the fully closed position the rotational toque TM1 in the minimum torque characteristic line TMu3 must exceed the rotational torque TB1 in the maximum torque characteristic line TBu3. Conversely, in order to return the valve member 70 from the fully closed position to the fully opened position by the torque spring 64(172), the rotational torque TB1 in the minimum torque characteristic line TBu1 must exceed the rotational torque TO produced by the motor 260 when no current is supplied.

By designing the motor 260 and the torque spring 64(172) to satisfy the above conditions, the valve member 70 can be rotated from the fully opened position to the fully closed position by the motor 260 against the biasing force of the torque spring 64(172). In addition, it is also possible to return the valve member 70 from the fully closed position to the fully opened position by the biasing force of the coil spring 64(172) when no current is supplied to the motor 260.

According to the above representative embodiment, the rotational torque of the motor 260 produced during the rotation of the valve member 70, between the angle θx and the angle θy respectively corresponding to the fully opened position and the fully closed position, are set to be greater than the rotational torque of the torque spring 64(172). Therefore, the motor 260 can reliably rotate the valve member 70 from the fully open position to the fully closed position against the biasing force of the torque spring.

In addition, the rotational torque of the motor 260 during the rotation from the fully opened position to the fully closed position increases from the value TM1, produced at the rotational angle θx corresponding to the fully opened position, to the maximum torque value TMm, and then decreases to the value TM2, produced at the rotational angle θy corresponding to the fully closed position. Further, the difference between the torque value TM1 and TM2 is greater than the increased torque of the torque spring 64(172) during the rotation of the valve member 70 from the fully opened position to the fully closed position. By setting the torque value TM1 of the motor 260 produced at the rotational angle θx, corresponding to the fully opened position, to be greater by the necessary and minimum value than the rotational torque TB1 of the torque spring 64(172) at the fully opened position, it can be ensured that the rotational torque of the motor 260 exceeds the rotational torque of the torque spring 64(172) throughout the operational rotational range.

Further, in the above representative embodiment, the ratio of increase of the rotational torque of the motor 260 in the range around the fully opened position, during the rotation from the fully opened position toward the fully closed position, is set to be greater than the ratio of decrease of the rotational torque of the motor 260 in the range around the fully closed position. Therefore, it is possible to set a large difference between the rotational torque TM2 produced in the fully closed position and the rotational torque TM1 produced in the fully opened position, while the rotational torque TM2 is greater than the rotational torque TM1.

Furthermore, according to this representative embodiment, the resistance of the stator coil 268 of the motor 260 is set to be 20Ω, a value that is generally incorporated in the conventional valve actuator. For this reason, it is not necessary to change the specifications of the switching transistor TR1 of the ECU. Therefore, the representative embodiment can be economically used in combination with an existing ECU. Of course, the resistance value of the stator coil 268 may be changed in response to the specifications of the transistor TR1.

As noted in the description of the preferred embodiment of the valve returning device 1, the torque spring 64(172) may apply the biasing force in such a way that the torque spring 64(172) serves to close the valve member 260 when the supply of the current to the motor 260 has been interrupted.

The invention claimed is:

1. A valve device for controlling a flow of an intake air within a surge tank connected to an engine, wherein the surge tank is divided into a plurality of tank chambers by a partition wall disposed within the surge tank, the valve device comprising:

a valve body having a frame mounted within a communication opening defined in the partition wall, wherein the valve body includes a frame defining a frame opening;

a valve member rotatably mounted to the valve body in order to open and close the frame opening;

a motor coupled to the valve member and arranged and constructed to rotate the valve member, wherein the motor includes a stator molded integrally with the valve body;

a first rotary shaft connected to a first end of the valve member on a side of the motor;

wherein the frame includes a first frame portion on the side of the motor and a first support portion formed on the first frame portion and having an outer diameter;

wherein the first portion has a thickness substantially equal to or greater than the outer diameter of the first support portion; and wherein the first frame portion further includes a thickness reduced portion.

2. A valve device for controlling a flow of an intake air within a surge tank connected to an engine, wherein the surge tank is divided into a plurality of tank chambers by a partition wall disposed within the surge tank, the valve device comprising:

a valve body having a frame mounted within a communication opening defined in the partition wall, wherein the valve body includes a frame defining a frame opening;

a valve member rotatably mounted to the valve body in order to open and close the frame opening;

a motor coupled to the valve member and arranged and constructed to rotate the valve member, wherein the motor includes a stator molded integrally with the valve body;

a second rotary shaft connected to a second end of the valve member on a side opposite to the motor, and wherein the frame further includes a second frame portion on the side opposite to the motor, and a second support portion is formed on the second frame portion in order to rotatably support the second rotary shaft, and wherein the second frame portion is engageable with a projection formed on the partition wall along the communication opening in a position opposing the second frame portion, and wherein the projection has a thickness greater than a typical thickness of the partition wall.

3. The valve device as in claim 2, wherein the projection has a width substantially equal to the width of the second frame portion.

4. A valve device for controlling a flow of an intake air within a surge tank connected to an engine, wherein the surge tank is divided into a plurality of tank chambers by a partition wall disposed within the surge tank, the valve device comprising:

a valve body having a frame mounted within a communication opening defined in the partition wall, wherein the valve body includes a frame defining a frame opening;

a valve member rotatably mounted to the valve body in order to open and close the frame opening;

a motor coupled to the valve member and arranged and constructed to rotate the valve member, wherein the motor includes a stator molded integrally with the valve body;

wherein the valve body further includes a motor housing formed integrally with the valve body, and a stator is integrated within the motor housing;

wherein the motor further includes a rotor shaft coupled to the valve member and disposed within the motor housing;

wherein the valve member rotates from a first position to a second position as the motor is energized to produce a rotational torque for rotating the rotor shaft in a first direction;

wherein the valve device further includes a valve returning device arranged and constructed to return the valve member from the second position to the first position when the motor is de-energized;

wherein the valve returning device is disposed within the motor housing; and wherein the valve returning device comprises:

a coil spring having a first end and a second end, a first spring support member arranged and constructed to connect the first end of the coil spring to the rotor shaft; and a second spring support member arranged and constructed to connect the second end of the coil spring to the motor housing, wherein the coil spring applies a rotational torque to the rotor shaft in a direction opposite to the first direction, and a cover mounted to the motor housing in order to close a housing opening formed in the motor housing, and wherein the second spring support member is formed on an inner wall of the cover.

5. The valve device as in claim 4, wherein the housing opening is defined in the motor housing in order to insert the first spring support member and the coil spring into the motor housing.

6. The valve device as in claim 5, wherein the motor housing includes a tubular portion that includes the housing opening, and wherein the cover is closely fitted into the tubular portion.

7. The valve device as in claim 6, wherein the cover has a substantially cylindrical tubular configuration with an open end and a closed end, wherein a positioning projection and a corresponding positioning recess for engaging the positioning projection are formed on one and the other of the cover and the tubular portion of the motor housing in order to position the cover relative to the tubular portion in a circumferential direction.

8. The valve device as in claim 4, wherein:

the rotor shaft has an end portion having a non-circular cross section, and the first spring support member has a fitting hole having a corresponding non-circular configuration conforming to the cross sectional configuration of the end portion of the rotor shaft, wherein the end portion of the rotor shaft is press-fitted into the fitting hole of the first spring support member, and wherein a plurality of fitting projections are formed on an inner periphery of the fitting hole and extend in a fitting direction of the end portion of the rotor shaft, and wherein the fitting hole includes at least one corner portion; and wherein a substantially semi-circular recess is formed in the first spring support member around the corner portion to extend parallel to the fitting projections.

9. The valve device as in claim 8, wherein the fining hole has a substantially semi-circular configuration with a curved portion and a linear portion, wherein the fitting projections are formed along the curved portion, and wherein a semi-circular recess is formed around each end of the linear portion.

10. The valve device as in claim 4, wherein the first spring support member further includes a first stopper portion, and the second spring support member further includes a second stopper portion, wherein the first stopper portion and the second stopper portion contact with each other to inhibit further movement of the valve member when the valve member returns to the first position by the biasing force of the coil spring.

11. The valve device as in claim 4, further including a retainer and a positioning protrusion formed on the inner wall of the cover,
wherein the retainer is arranged and constructed to retain engagement of the second end of the coil spring with the second spring support member, and the positioning protrusion is arranged and constructed to support the coil spring in a position axially aligned with the rotor shaft.

12. A valve device for controlling a flow of an intake air within a surge tank connected to an engine, wherein the surge tank is divided into a plurality of tank chambers by a partition wall disposed within the surge tank, the valve device comprising:
a valve body having a frame mounted within a communication opening defined in the partition wall, wherein the valve body includes a frame defining a frame opening;
a valve member rotatably mounted to the valve body in order to open and close the frame opening;
a motor coupled to the valve member and arranged and constructed to rotate the valve member,
a motor housing arranged and constructed to receive the motor therein,
wherein the motor includes a rotor shaft coupled to the valve member, so that the valve member rotates from a first position to a second position when a current is supplied to the motor to produce a rotational torque for rotating the rotor shaft in a first direction, and
wherein the valve device further includes a valve returning device arranged and constructed to return the valve member from the second position to the first position when the current is no longer supplied to the motor, and
wherein the valve returning device is disposed within the motor housing,
wherein the valve returning device comprises:
a coil spring having a first end and a second end,
a first spring support member arranged and constructed to connect the first end of the coil spring to the rotor shaft; and
a second spring support member arranged and constructed to connect the second end of the coil spring to the motor housing, so that the coil spring applies a rotational torque to the rotor shaft in a direction opposite to the first direction, and
a cover mounted to the motor housing in order to close a housing opening formed in the motor housing,
wherein the second spring support member is formed on an inner wall of the cover.

13. The valve device as in claim 12, wherein the housing opening is defined in the motor housing in order to insert the first spring support member and the coil spring into the motor housing.

14. The valve device as in claim 12, wherein the first spring support member includes a first stopper portion, and the second spring support member includes a second stopper portion, so that the first stopper portion and the second stopper portion contact with each other to limit further movement of the valve member when the valve member returns to the first position by the biasing force of the coil spring.

15. The valve device as in claim 12, further including a retainer and a positioning protrusion formed on the inner wall of the cover,
wherein the retainer is arranged and constructed to retain engagement of the second end of the coil spring with the second spring support member, and the positioning protrusion is arranged and constructed to support the coil spring in a position axially aligned with the rotor shaft.

16. A valve device for controlling a flow of an intake air within a surge tank connected to an engine, wherein the surge tank is divided into a plurality of tank chambers by a partition wall disposed within the surge tank, the valve device comprising:
a valve body having a frame mounted within a communication opening defined in the partition wall, wherein the valve body includes a frame defining a frame opening;
a valve member rotatably mounted to the valve body in order to open and close the frame opening;
a motor coupled to the valve member and arranged and constructed to rotate the valve member, and
a motor housing arranged and constructed to receive the motor therein,
wherein the motor includes a rotor shaft coupled to the valve member, so that the valve member rotates from a first position to a second position when a current is supplied to the motor to produce a rotational torque for rotating the rotor shaft in a first direction, and
wherein the valve device further includes a valve returning device arranged and constructed to return the valve member from the second position to the first position when the current is no longer supplied to the motor, and
wherein the valve returning device is disposed within the motor housing, and
the rotor shaft has an end portion having a non-circular cross section, and the first spring support member has a fitting hole having a non-circular configuration conforming to the cross sectional configuration of the end portion of the rotor shaft,
wherein the end portion of the rotor shaft is press-fitted into the fitting hole of the first spring support member, and
wherein a plurality of fining projections are formed on an inner periphery of the fitting hole and extend in a fitting direction of the end portion of the rotor shaft, and
wherein the fitting hole includes at least one corner portion; and
wherein a substantially semi-circular recess is formed in the first spring support member around the corner portion to extend parallel to the fitting projections.

17. The valve device as in claim 16, wherein the fitting hole has a substantially semi-circular configuration with a curved portion and a linear portion,
wherein the fitting projections are formed along the curved portion, and
wherein a pair of semi-circular recesses are formed around both ends of the linear portion.

* * * * *